US008331987B2

(12) United States Patent
Rosenblatt

(10) Patent No.: US 8,331,987 B2
(45) Date of Patent: Dec. 11, 2012

(54) PERSONAL AREA NETWORK SYSTEMS AND DEVICES AND METHODS FOR USE THEREOF

(75) Inventor: Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 11/788,566

(22) Filed: Apr. 19, 2007

(65) Prior Publication Data

US 2008/0261529 A1 Oct. 23, 2008

(51) Int. Cl.
*H04B 1/38* (2006.01)
(52) U.S. Cl. ............ 455/556.2; 455/422.1; 455/411; 455/41.2; 370/328; 709/225; 713/168
(58) Field of Classification Search .......... 455/41, 455/411, 442, 569, 305, 41.2, 556.2, 557, 455/422.1, 11.1, 15; 370/463, 315, 401, 370/229, 338, 328; 713/168; 709/225
See application file for complete search history.

(56) References Cited

U.S. PATENT DOCUMENTS

| 6,607,134 | B1 * | 8/2003 | Bard et al. ............. 235/472.01 |
| 6,795,688 | B1 | 9/2004 | Plasson et al. |
| 2002/0065099 | A1 * | 5/2002 | Bjorndahl ................ 455/553 |
| 2002/0086716 | A1 * | 7/2002 | Pan ........................ 455/569 |
| 2003/0090598 | A1 | 5/2003 | Johngren et al. |
| 2004/0063456 | A1 | 4/2004 | Griffin et al. |
| 2005/0020302 | A1 * | 1/2005 | Ikeda et al. ............. 455/556.1 |
| 2005/0059380 | A1 * | 3/2005 | Tomita .................... 455/411 |
| 2005/0148353 | A1 | 7/2005 | Hicks, III et al. |
| 2005/0157661 | A1 | 7/2005 | Cho |
| 2006/0023738 | A1 | 2/2006 | Sanda |
| 2006/0075537 | A1 | 4/2006 | Tsai |
| 2006/0268329 | A1 | 11/2006 | Lo |
| 2007/0041582 | A1 * | 2/2007 | Lam ........................ 379/908 |
| 2007/0080933 | A1 * | 4/2007 | Chen et al. ............... 345/156 |
| 2007/0136205 | A1 | 6/2007 | Przybilla |
| 2007/0238484 | A1 * | 10/2007 | Liu ......................... 455/557 |
| 2011/0170842 | A1 * | 7/2011 | Krikorian ................ 386/291 |

FOREIGN PATENT DOCUMENTS

WO WO 00/38443 6/2000

OTHER PUBLICATIONS

Skee, Grahm on Jan. 12, 2007, "Samsung T9B Ties Into You Mobile Phone", MP3 Player Reviews News, http://www.anythingbutipod.com/archives/2007/01/samsung-t9b-ties-int-vou-mobile-phone.php, printed on Apr. 19, 2007.
"Method for a short range wireless, PC card interface or USB adapter for using the laptop/PC as a speakerphone/dialer with specialized wireless phones", IP.COM Journal, IP.COM Inc., West Henrietta, NY (Jul. 13, 2004).
International Search Report, issued Aug. 6, 2008 in counterpart international application No. PCT/US2008/004688.

* cited by examiner

*Primary Examiner* — Kamran Afshar
*Assistant Examiner* — Manpreet Matharu
(74) *Attorney, Agent, or Firm* — Meyertons, Hood, Kivlin, Kowert & Goetzel, P.C.

(57) ABSTRACT

Systems and methods are provided for interfacing wireless communications between two devices such that a device devoid of a relatively long-range communications protocol can access that protocol. This may be accomplished by providing a host device having relatively short-range communications circuitry integrated therein, which circuitry may be operative to communicate with relatively short-range communications circuitry of a multi-protocol or long-range communications device that also includes relatively long-range communications circuitry.

23 Claims, 23 Drawing Sheets

1280

| CONTACTS |
|---|
| BETH |
| CARL |
| DAD |
| EVELYN |
| IVAN |
| KAREN |
| KATHLEEN |

FIG. 12A

PERSONAL AREA NETWORK SYSTEMS AND DEVICES AND METHODS FOR USE THEREOF

BACKGROUND OF THE INVENTION

This relates to personal area networks, devices that may be used in such networks and applications using such networks.

Electronic devices may be equipped with some form of relatively short range communications circuitry, such as Bluetooth communications circuitry, for enabling communication between those devices. For example, a computer and a mouse may each have Bluetooth communications circuitry and may be able to communicate to each other via a Bluetooth protocol. In another example, a wireless telephone may communicate with a headset via Bluetooth or other protocol.

Certain devices, such as wireless telephones, may include circuitry for handling relatively short range communications protocols (e.g., Bluetooth or Wi-Fi) and relatively long-range communications protocols (e.g., RF communications protocols such as GSM, GSM with EDGE, and quadband). Other devices may be devoid of any such communications circuitry. Such devices may include, for example, digital music and video players such those device sold under the name iPod® from Apple Inc. of Cupertino, Calif. It is common for a user to carry both a multi-communications protocol device (e.g., wireless telephone) and a communicationless protocol device (e.g., digital music player). However, because these devices are independent of each other—that is, they do not communicate with each other—the user may be burdened with the task of switching between devices to perform a desired function (e.g., place a call or listen to music). Systems may exist for interfacing the multi-communications protocol device (e.g., phone) with the communicationless protocol device (e.g., digital music player), however, such systems require a cumbersome use of wires to interface the devices (even if the wire is attached to relatively short range circuitry for communicating wirelessly with the relatively short range circuitry of the multi-communications protocol device).

SUMMARY OF THE INVENTION

Systems and methods are provided for interfacing wireless communications between two devices such that a device devoid of a relatively long-range communications protocol can access that protocol. This may be accomplished by providing a host device having relatively short-range communications circuitry integrated therein, which circuitry may be operative to communicate with relatively short-range communications circuitry of a multi-protocol or long-range communications device that also includes relatively long-range communications circuitry. As defined herein, a host device is a device devoid of circuitry for communicating with a long-range communications protocol, but is capable of communicating wirelessly using one or more relatively short-range communications protocols or over a signal transmission medium (e.g., a wire, optic cable, fabric, or skin) with another device. A multi-protocol or long-range communication device may be a device capable of communicating with a device using one or more relatively short-range communications protocols and with a network or communications source using a relatively long-range communications protocol.

The host device can include an interface for enabling a user to access functions typically only provided in devices including long-range communications circuitry. For example, a user may place or take a telephone call using the host device by wirelessly communicating with the long-range communications device via the short-range communications protocol. Thus, an advantage of the invention is that the host device can serve as the interface for performing functions on both the host device and long distance communication device.

In one embodiment, the long-range communication protocol device may include a user interface. This user interface may be accessed independent of the host device to, for example, place or take calls or access other applications or functions that may be executed on the multi-protocol device.

In another embodiment, the long-range communication device may be a "dummy" device or an RF module that includes both short and long-range communications circuitry and an optional power source. The RF module may be constructed with or without a direct user interface. In addition, the RF module may be constructed to be a high efficiency, low cost, device that provides a host device access to a long-range communications protocol. In some embodiments, the RF module may be powered by an external power source such as an outlet.

RF modules may be ubiquitous in that they permeate every aspect of a person's life. For example, a user may keep a RF module on his or her person such in a purse, handbag or article of clothing, in a house, a transportation vehicle (e.g., a car), or an office. This way, a user need not worry about having to carry a long-range communications device wherever he or she may go, as a RF module may be kept in locations frequently visited by the user. In some applications, multiple RF modules may be kept in a location (e.g., a house or city). When the user moves from one location to another, the host device may determine which RF module to access when requiring use of a long-range communications protocol. In addition, the host device may maintain a communication event (e.g., a telephone call) without interruption (e.g., a dropped call) when switching from one RF module to another or to a wireless phone.

Regardless of which long-range communications device is used, the host device can serve as the primary interface unit or host of a personal area network that wirelessly interfaces that long-range communication device. In some embodiments, the host device may be used to participate in communication events, such as telephone calls and text messages. For example, a user may scroll through a list of contacts on the host device, select a contact, and initiate a call with the selected contact. In another example, while a user is listening to music, the host device can indicate to the user the occurrence of a communication event (e.g., telephone call or text message) and provide the user with an opportunity to interact with the communication event.

In other embodiments, peripheral devices may communicate with the host device or a hybrid host/long-range communications device (e.g., a phone including short range communications circuitry) using a short range communications protocol. Peripheral devices can be portable, handheld, miniature, or wearable devices. The peripheral device can be used to control the operation of the host or hybrid device or may be used to display information relating to a function or feature of the host or hybrid device. For example, a peripheral device may be a fashion accessory such as a watch that may display information (e.g., the name of the currently playing song or name of the person on the call) and also allow a user to control functions (e.g., playback, volume, or telephony features such as end call and accept call) of the host device. Other peripheral devices may provide host control functions but may not have a display, and yet other peripheral devices may provide input (e.g., keyboard) and output (e.g., LCD or printer) functions.

A personal area network may be provided for use in an automobile or in connection with a communications system in accordance with embodiments of the invention. In one embodiment a host device may be physically connected to an automobile stereo system and may allow a user to access telephony features provided by the host device using the stereo system. For example, a user may browse through contact list information (stored on the host device) using the stereo system and select a user to initiate a call. When the call is initiated, the host device may access the long-range communications protocol of a RF module or wireless phone to conduct the call. The user's voice may be picked by a microphone that may be integrated within the host device, a cable interconnecting the host device and the stereo system, or associated with the car stereo or other communications system of the automobile.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIG. 12A shows a an illustrative contacts list screen in accordance with an embodiment of the invention;

DETAILED DESCRIPTION OF THE DISCLOSURE

U.S. patent application Ser. No. 11/788,545, filed Apr. 19, 2007, entitled "Personal Area Network Systems and Devices for use Thereof" is incorporated by reference herein in its entirety.

U.S. patent application Ser. No. 11/788,562, filed Apr. 19, 2007, entitled "Personal Area Network Systems and Devices for use Thereof" is incorporated by reference herein in its entirety.

Figure 1:
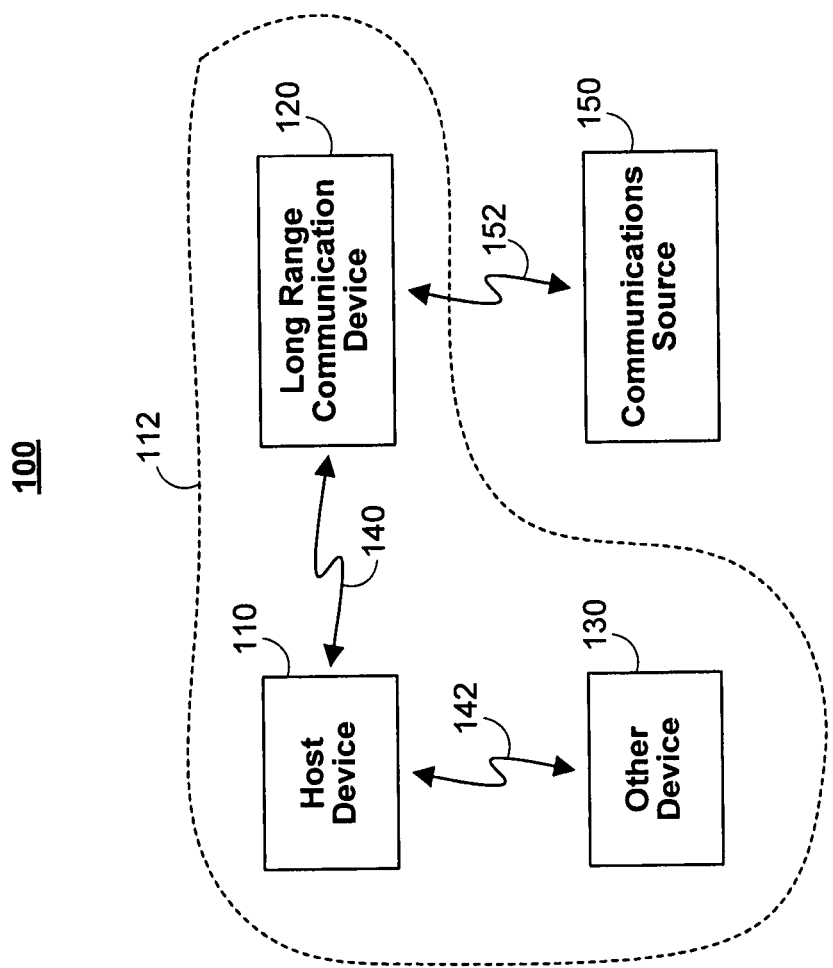
FIG. 1 is block diagram of a personal network system according to an embodiment of the invention.

FIG. 1 is block diagram of a personal network system 100 according to an embodiment of the present invention. System 100 includes host device 110 which provides a short-range communications protocol network 112. Device 110 may be able to wirelessly communicate with other devices such as long-range communications device 120 and other device 130 located within network 112. Device 110 may include circuitry capable of performing wireless communication with a relatively short-range wireless communication protocol such as Wi-Fi (e.g., a 802.11 protocol), Bluetooth (registered trademark), high frequency systems (e.g., 900 MHz, 2.4 GHz, and 5.6 GHz communication systems), other relatively localized wireless communication protocol, or any combination thereof. Devices located within short-range communications protocol network 112 may wirelessly communicate over a local wireless communication path such as paths 140 and 142. As defined herein, a local wireless communication path enables wireless communication using a short-range communications protocol. When a device is not within network 112, that device may be out of range and not able to wirelessly communicate with device 110. Therefore, a device may need to be within network 112 to be able to wirelessly communicate with device 110.

In one embodiment, the short range communications circuitry may be integrated within the packaging of device 110 (e.g., integrated into a printed circuit board of the device), or in other embodiments, may be included in an accessory device that is docked or connected to device 110. The accessory device may be, for example, a relatively unobtrusive device that provides device 110 with short-range communicating functionality such as a dongle that plugs into device 110. A more detailed discussion of a dongle or docking station that can be plugged into device 110 can be found, for example, in U.S. patent application publication No. 2004-0224638, which is incorporated by reference in its entirety herein.

Examples of device 110 may include, for example, a media player sold under the name iPod® by Apple Inc., of Cupertino, Calif., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system). In some embodiments, device 110 does not include relatively long-range communications circuitry, and thus cannot place or receive communications events independently, for example, in the same manner a wireless telephone can independently place or receive a call. In some embodiments, even though device 110 does include long-range communications circuitry, device may be able to place or receive calls using VOIP or LAN.

Long-range communication device 120 may be a device capable of communicating with a device using one or more relatively short-range communications protocols (as discussed above) and with communications source 150 using one or more relatively long-range communications protocols. Long-range communication device 120 may sometimes be referred to herein as a multi-protocol device. The short-range communications protocol may be same protocol used by device 110 to establish a short range communications network (e.g., network 112). The long-range communications protocol may include, for example, protocols used by wireless and cellular phones and personal email devices (e.g., Blackberry (registered trademark)). For example, such protocols can include GSM, GSM plus EDGE, CDMA, quad-band, and other cellular protocols. In another example, a long range communications protocol can include wi-fi. An example of multi-protocol device may be a wireless telephone with Bluetooth. Another example of such a device may be a "RF module," which is discussed in more detail below in connection with FIGS. 3-5.

One of the advantages provided by embodiments of the present invention is that one device, which can be devoid of a particular communications protocol, can directly wirelessly access another device which has that particular communications protocol. For example, host device 110 can access device 120 to have access to a two-way long-range communications protocol that is not included with host device 110.

There may be applications where in one embodiment, a particular communications protocol (e.g., wi-fi) can be used as a short-range communications protocol, and in another embodiment, that same particular communications protocol (e.g., wi-fi) can be used as the long-range communications protocol. Regardless of which embodiment is implemented, when a particular communications protocol is used for a short-range communications protocol, a communications protocol other than that particular communications protocol used for the short-range communications protocol is used for a long-range communications protocol.

Communications source 150 may be a network or communications tower that device 120 communicates with over long-range path 152. Communications source 150 may be, for example, a wireless communications infrastructure including communications towers and telecommunications servers.

Communications using short and long-range communications protocols can include two-way communications. That is, the circuitry using the short or long-range communications protocol can send and receive data. For example, host device 110 can transmit information to and receive information from long-range communications device 120 using a short-range protocol. Long-range communications device 120 can transmit and receive data from communications source 150 using a long-range communications protocol.

While the differences between long-range and short-range wireless communications may at times become blurred (e.g., it may be difficult to differentiate the communication range of long and short-range protocols), one differentiating factor may be the bandwidth or data transfer rate of the wireless communication protocol. Certain short-range protocols may transfer data at a higher rate than long-range protocols. For example, a short-range wireless protocol such as 802.11 may transfer data at 54 Mb/s. Another differentiating factor may be power consumption. Certain short-range protocols may require more power to operate than their long-range counterparts. For example, a Wi-Fi communications protocol may consume more power than a wireless phone broadband communication protocol. Other short-range protocols such as Bluetooth may consume less power than a long-range protocol with a tradeoff that it may not transmit data at a rate higher than the long-range counterpart. Thus, a tradeoff may exist between long and short-range wireless communication protocols, each protocol providing its own advantages.

Another differentiating factor between short-range and long-range protocols may be the distance signals travel from one node to another without using an intermediate medium such as a network or repeater station. For example, node-to-node distances for long-range protocols may be at least one order of magnitude greater than node-to-node distances for short-range protocols. Short-range protocols may have node-to-node distances that extend up to a first predetermined distance and long-range protocols may have node-to-node distances that extend to a second predetermined distance, where the second predetermined distance is greater than the first predetermined distance. The long-range node-to-node distance may be at least 100 feet, 500 feet, or 1000 feet. The traveling distance may include the distance signals can travel and still contain data that can be retrieved. That is, a signal may have an effective traveling distance (which includes the range in which data can be transmitted from one node and accessed by another node) even though the signal may travel further.

While certain wi-fi communications (e.g., long-range wi-fi) can communicate data over distances that span several miles (e.g., up to 130 miles), this requires specific point-to-point connectivity and substantial power, more power that may be provided by a portable hand-held electronic device. In addition, such long-range wi-fi can emit dangerous levels of radiation, levels that can far exceed maximum levels set by governing bodies such as the Federal Communications Commission for use in portable devices. In some embodiments, the long-range communications protocol includes communications protocols other than long-range wi-fi.

Other device 130 shows that device 110 may host a network for other devices in addition to device 120. Device 130 may be a device including only short-range communications circuitry or both short and long-range communications circuitry that communicates with device 110 over local path 142. In one embodiment, device 130 may be an accessory (e.g., a watch) capable of short range communication and may include a user interface. The user may interact with the interface to execute a function (e.g., modify playback of media or cause device 110 to receive or end a call) without requiring the user to physically interact with device 110 directly. It is understood that multiple such other devices 130 may be wirelessly interfaced with device 110's network, but only one is shown in the drawing to avoid overcrowding.

Wireless short-range communications can refer to direct node-to-node wireless communications between two devices without use of an intermediate medium. For example, host device 110 can wirelessly communicate directly with long-range communications device 120 or directly with other device 130 without the use of an intermediate medium (e.g., network, server or repeater). In addition, long-range communications can refer to direct node-to-node wireless communications without the use of an intermediate medium. Though, when a signal is wirelessly received at a node in a direct node-to-node communication, it may be routed through an intermediate medium (e.g., network) to reach a desired destination (e.g., another node).

Figure 2:
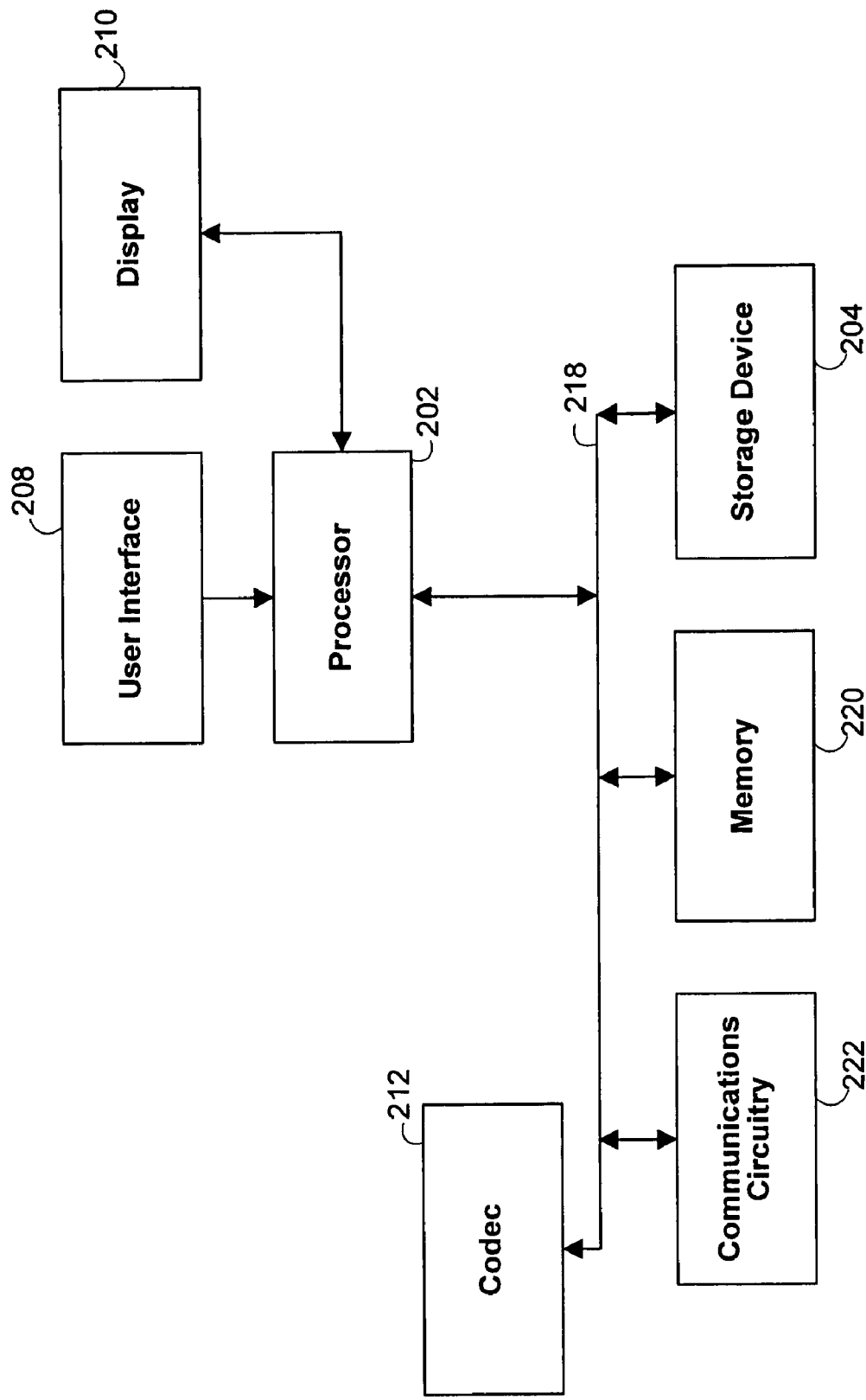
FIG. 2 shows a simplified block diagram of illustrative portable electronic device according to an embodiment of the invention.

FIG. 2 shows a simplified block diagram of illustrative portable electronic device 200. Device 200 may serve as the host of a personal area network or short range network according to the invention. Device 200 may include processor 202, storage device 204, user interface 208, display 210, CODEC 212, bus 218, memory 220, and communications circuitry 222. Processor 202 can control the operation of many functions and other circuitry included in electronic device 200. Processor 202 may drive display 210 and may receive user inputs from user interface 208.

Storage device 204 or memory 220 may store media (e.g., music and video files), software (e.g., for implementing functions on device 200), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 200 to establish a wireless connection using a multi-protocol device), subscription information (e.g., information that keeps tracks of podcasts or television shows or other media a user subscribes to), contacts information (e.g., telephone numbers and email address), calendar information, and any other suitable data. Storage device 204 may store data for "pairing" itself or communicating with one or more devices (e.g., a multi-protocol device) using a short range communications protocol. Storage device 204 may include one more storage mediums, including for example, a hard-drive, flash memory, permanent memory such as ROM, semi-permanent memory such as RAM, or cache.

Memory 220 may include one or more different types of memory which may be used for performing device functions. For example, memory 220 may include cache, Flash, ROM, and/or RAM. Memory may be specifically dedicated to storing firmware. For example, memory may be provided for storing firmware for device applications (e.g., operating system, user interface functions, and processor functions). Memory 220 may also store media. It is understood that device 200 can include storage device 204, but not memory 220, or memory 220, but not storage device 204.

Bus 218 may provide a data transfer path for transferring data to, from, or between storage device 204, communications circuitry 222, memory 220, and processor 202. Coder/decoder (CODEC) 212 may be included to convert digital audio signals into an analog signal, which may be provided to an output port (not shown).

User interface 208 may allow a user to interact with electronic device 200. For example, user input device 208 can take a variety of forms, such as a button, keypad, dial, click wheel, or touch screen. User interface 208 may include a multi-touch screen such as that described in U.S. Pat. No. 6,323,846, which is incorporated by reference herein in its entirety. User interface 208 may emulate a rotary phone or a multi-button keypad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Communications circuitry 222 (sometimes referred to herein as personal area network circuitry or short-range communications circuitry) may enable device 200 to function as a host for a personal area network. That is, communications circuitry 222 may enable device 200 to wirelessly communicate with one or more devices using a short range communications protocol. For example, communications circuitry 222 may support wi-fi communications (e.g., one of the 802.11 standards), Bluetooth, Nordic, high frequency systems (e.g., 900 MHz, 2.4 GHz, and 5.6 GHz communication systems), and other relatively localized wireless communication protocols.

In one embodiment, electronic device 200 may be a portable computing device dedicated to processing media such, as audio and video. For example, device 200 may be a media player (e.g., MP3 player), a game player, a remote controller, a portable communication device, a remote ordering interface, an audio tour player, or other suitable personal device. Device 200 may be battery-operated and highly portable so as to allow a user to listen to music, play games or video, record video or take pictures, place and take telephone calls when it has access to a multi-protocol device, control other devices, be controlled by a device associated with the host device's personal area network, and any combination thereof. In addition, device 200 may be sized such that it fits relatively easily into a pocket or hand of the user. By being handheld, or smaller, device 200 can be easily handled and utilized by its user and thus may be taken practically anywhere the user travels.

Figure 3:
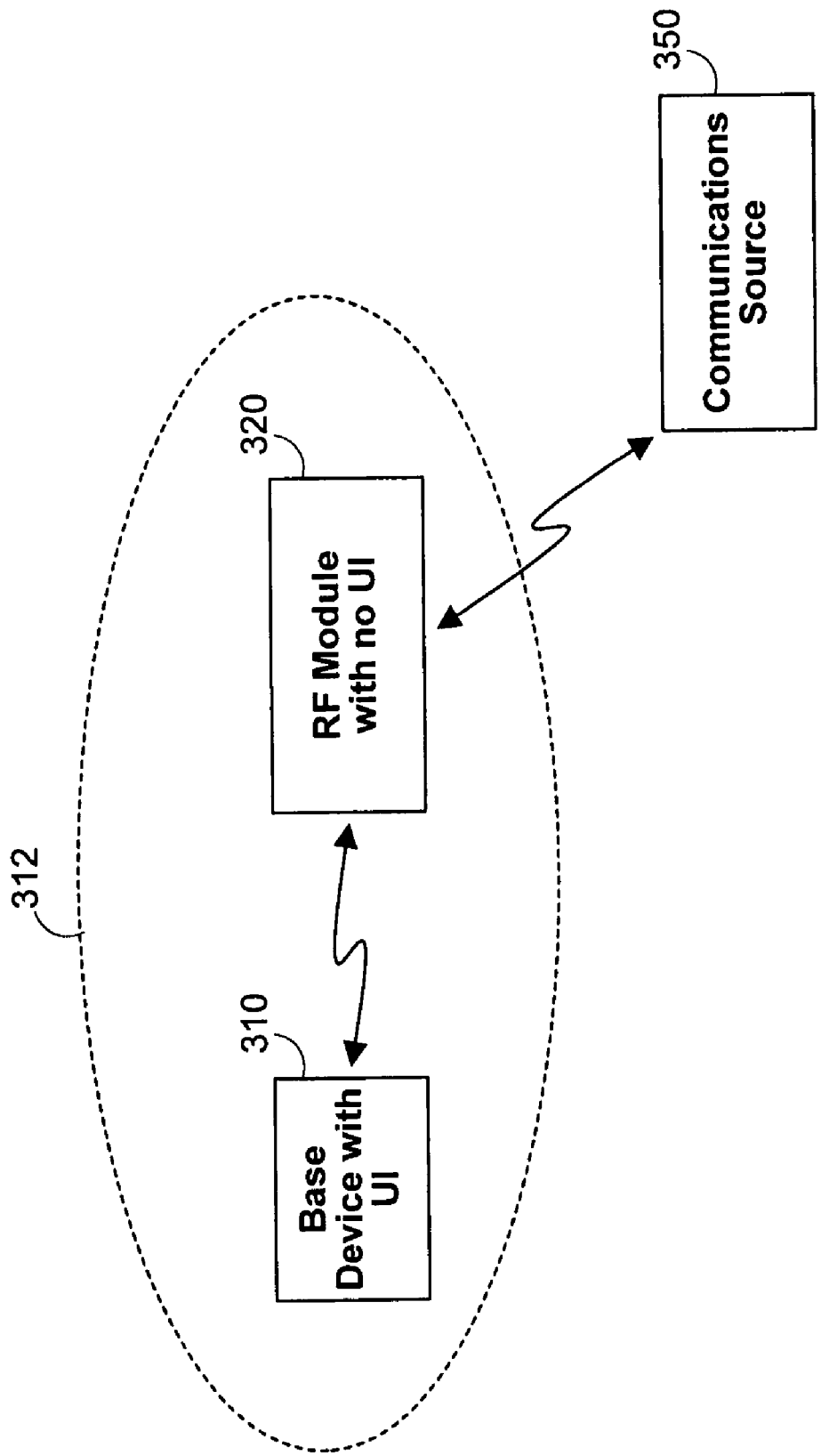
FIG. 3 is a block diagram of another personal network system according to an embodiment of the invention.

FIG. 3 is a block diagram of another personal network system 300 according to an embodiment of the present invention. System 300 can include host device 310, RF module 320, and communications source 350. Device 310 and RF module 320 may wirelessly communicate with each other using a short-range communications protocol. Device 310 may communicate with other devices (not shown) located within short-range network 312. RF module 320 and communications source 350 (which may be similar to communications source 150 of FIG. 1) may wirelessly communicate with each other using a long-range communications protocol. Communications between device 310 and device 320 and communications between device 320 and communications source 350 may be some form of two-way communications.

Device 310 may include a user interface and short range communications circuitry for communicating with short range circuitry included in RF module 320. In addition, device 310 may include software such as user-interface software that enables a user to access features typically reserved for devices having long-range communication capabilities. Including such software advantageously enables device 310 to serve as the "brain" or "host" of a personal area network and to communicate with relatively simplified devices (such as RF module 320) constructed for providing device 310 with access to one or more long-range communications protocols.

RF module 320 may be constructed to be a high efficiency, low cost, device including circuitry for supporting one or more long-range communications protocols. RF module 320 need not be constructed to include a user interface (e.g., a screen and a keypad) and software to execute functions that may be implemented in response to user interactions with the interface as the interface and such software may reside within device 310. Note, however, that RF module 320 may include some form of a limited interface such as, for example, an ON/OFF switch or a network presence indicator.

Figure 4:
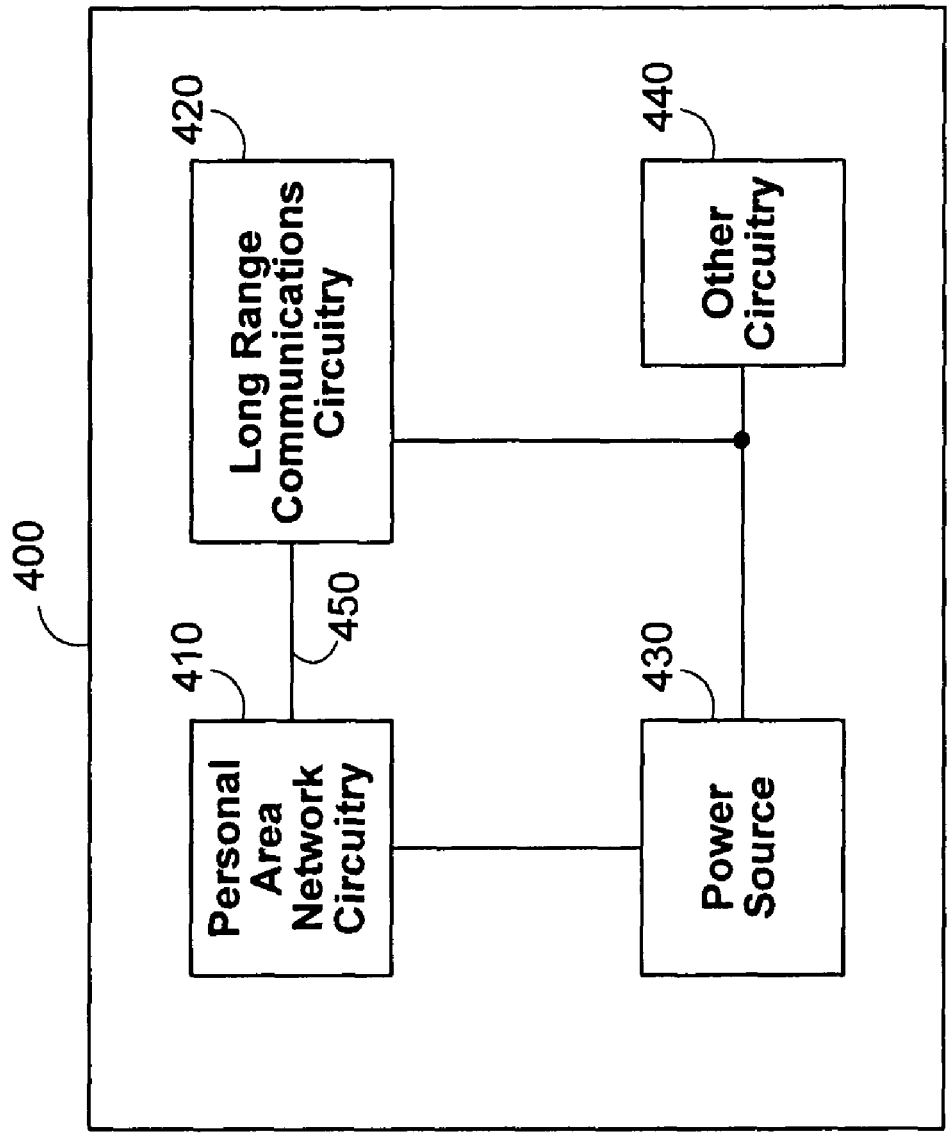
FIG. 4 shows an illustrative block diagram of a RF module in accordance with an embodiment of the invention.

FIG. 4 shows an illustrative block diagram of RF module 400 in accordance with an embodiment of the invention is shown. RF module 400 may include short range communications circuitry 410 (e.g., for communicating with a host device such as device 210 of FIG. 2), long-range communications circuitry 420 (e.g., for communicating with a communications source), and power source 430. Circuitry 410 and 420 may be powered by power source 430 and may communicate with each other over path 450. Short range communications circuitry 410 may include, for example, Bluetooth circuitry, Wi-Fi circuitry (e.g., 802.11), short-range radio circuitry (e.g., walkie-talkie type circuitry), NORDIC, a combination thereof, and any other suitable circuitry for handling relatively short range communications circuitry.

In addition to interfacing with a wireless network of a host device, short range circuitry 410 may be used to communicate with networks other than the personal area network provided by the host device, effectively extending the range of the host device's ability to transmit and receive data from a communications source operating according to the same short range communications protocol as RF module 400. For example, a short range communications source (e.g., a "wi-fi" hotspot) may provide email or other content (e.g., Internet content) to RF module 400.

Long-range circuitry 420 may include, for example, Global System for Mobile Communications (GSM) circuitry, Synchronous Code Division Multiplexing (CDMA) circuitry, General Packet Radio Service (GPRS) circuitry, GSM Evolution (EDGE) circuitry, or a combination thereof. Long-range circuitry 420 may be capable of processing telephone calls, emails, text messages (e.g., SMS texting), Internet data (e.g., for receiving web pages), global positioning information, and any other suitable data. Long-range communications circuitry 420 can also include an antenna (not shown).

Power source 430 may be a permanently fixed or removable rechargeable battery, such as a lithium-ion battery, disposable alkaline battery, or any other portable power source, including kinetic energy converters. RF module 400 may be constructed to receive power from an external source such as a conventional outlet, a car outlet, or an external battery pack. In some embodiments, power source 430 may be omitted if an external power source is used.

RF module 400 may include other circuitry 440 which may include, for example, memory, a processor, power management circuitry, or a combination thereof. Other circuitry 440 may be incorporated into one or more of circuitry 410 and 420.

RF module 400 may include identity circuitry (not shown) that uniquely identifies it to a communications source (not shown) so the communications source knows who it is communicating with. This circuitry may store a unique number or key such as those commonly associated with a Subscriber Identity Module (SIM) card or a Removable User Identity Module (RUIM) card that enables a wireless phone service provider to identify a wireless phone service subscriber. This identity circuitry may, in one embodiment, retain one or more SIM or RUIM cards. In another embodiment, the identity circuitry can be programmable (e.g., like firmware) to permanently store identification data.

Regardless of which identification embodiment is used, the ability to assign identifier information can be relatively simple and inexpensive. For example, a user can purchase a SIM card from a wireless service provider and insert the card into device 400. As another example, a user can download a software package, such as a firmware update, and install that software on device 400.

The identification data may be used to authenticate RF modules. Authentication can include the process of pairing one more RF modules to a host device or establishing communications with a communications source (e.g., cellular telephone network).

Figure 5:
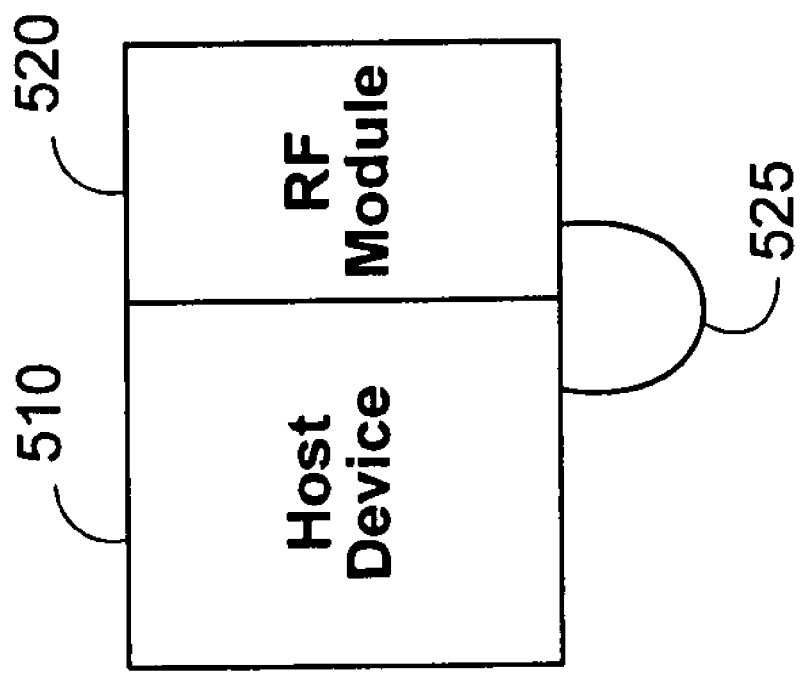
FIG. 5 shows a block diagram of another RF module in accordance with an embodiment of the invention.

FIG. 5 shows a block diagram of another RF module 520 in accordance with an embodiment of the present invention. RF module 520 may be connected to host device 510 by wired link 525 (e.g., a cable). Using wired link 525 to establish communication between device 510 and RF module 520 may enable module 520 to be constructed to include long-range communications circuitry (not shown) and an optional internal power source (not shown) but no short range communications circuitry. In addition, use of wired link 525 may provide for a more stable connection or faster throughput in data transfer between host device 510 and RF module 520 than a wireless connection. The internal power source may be optional because host device 510 may supply the power needed to operate electronics contained in RF module 520.

In some embodiments, RF module 520 may be physically attached to host device 510. For example, module 520 may clip onto host device 510 or module 520 may be constructed to retain host device 510 within a host device retaining region of the module. In some embodiments, RF module 520 may have a port for providing a direct module to host device connection, eliminating a need for a wired link.

Another advantage of the RF module according to embodiments of the invention is that designers have considerable design flexibility in its construction. While space requirements and the need for circuitry such as short range and long-range communications circuitry may be fixed, other components such as the battery may be selectively included and vary in size. For example, a RF module may be designed to be relatively lightweight and highly portable device by using, for example, a relatively small capacity battery. Larger and more robust RF modules may be constructed to have a relatively large capacity battery.

The RF module according to some embodiments of the invention may be used in many different applications, several, but not all, of which are disclosed herein. The RF module may provide a host device access to a communications protocol that may not otherwise be available. In one exemplary application, the RF module may provide the host device with the ability to process telephone calls, text messages, emails, and other services that may be provided by a wireless service provider, provided the host device is in communication with the RF module. As discussed above in connection with FIGS. 3 and 5, a host device may be in a wireless or non-wired communication with a RF module. Referring to FIG. 3, a host device may be in communication with a RF module if the RF module is within network 312. Specific examples of where personal area networks may exist between a host device and a RF module are shown in FIG. 6.

Figure 6:
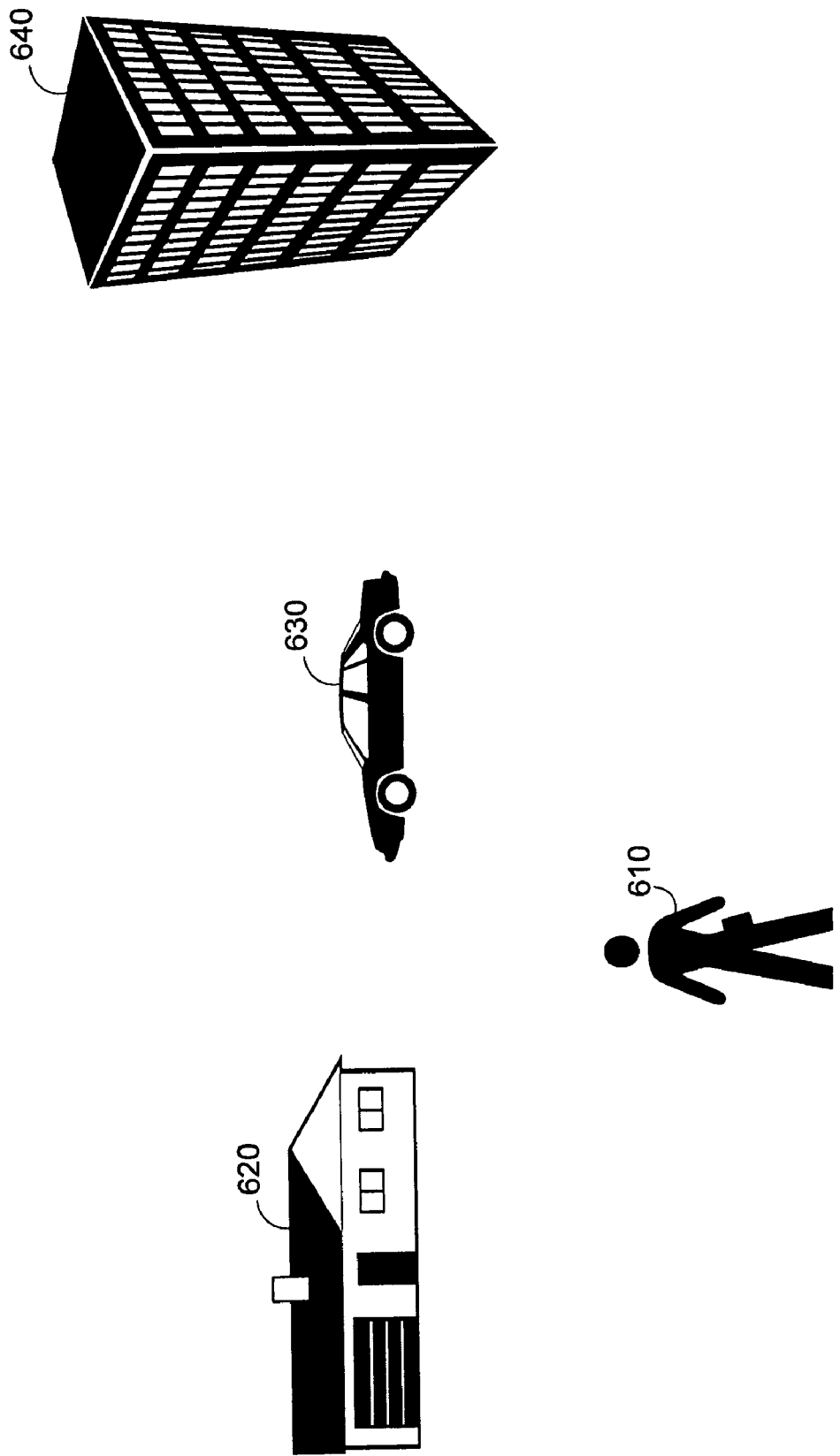
FIG. 6 shows several locations that may harbor a personal area network in accordance with embodiments of the invention.

FIG. 6 shows person 610, house 620, car 630, and office 640, each of which may harbor a personal area network. It should be understood that although each of these specific examples are discussed with reference to a RF module, devices other than a RF module (such as a wireless phone) may be used to provide the host device access to a long-range communications protocol. In each example, assume that at least a host device and multi-protocol device exists within the personal area network.

A personal area network may exist about person 610. In this example, the person may keep the host device and RF module in his or her pocket(s), or alternatively, the host device may be kept in a pocket and the RF module may be kept in another location located on the person (e.g., on another article of clothing) or substantially near the person such as an accessory item (e.g., handbag, backpack, or purse). In some embodiments, the RF module may be integrated with clothing or an accessory item, providing functional fashion having communications ability. As defined herein, integration of a RF module refers to incorporating the RF module into an item such that it appears to be part of the item, not merely residing within or attached to the item.

Figure 7B:
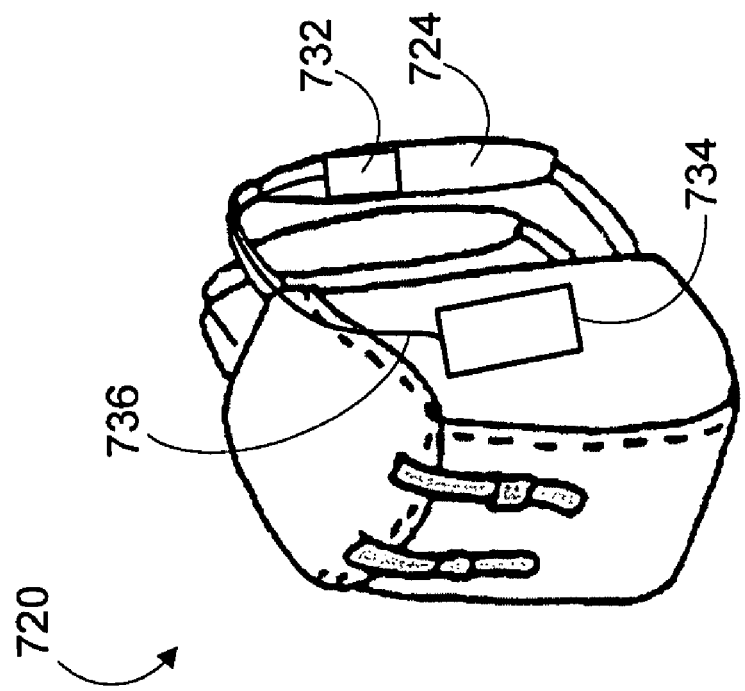
FIGS. 7A-D show different articles that can be integrated with a RF module in accordance with embodiments of the invention.
Figure 7A:
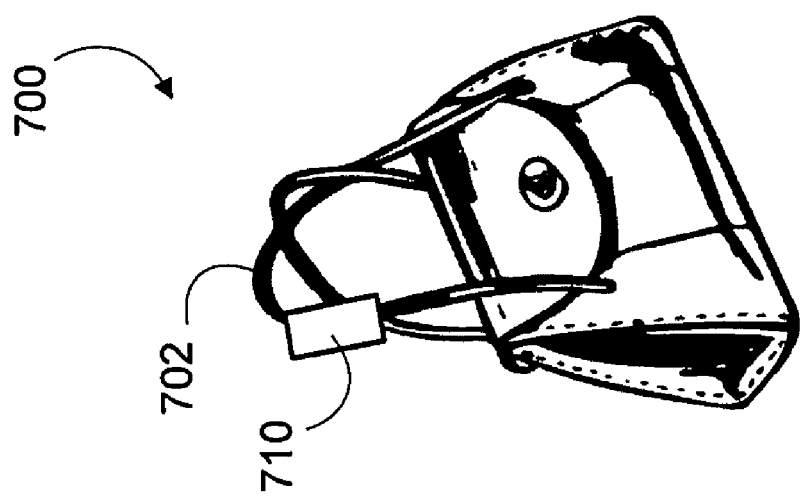

FIG. 7A shows an example of bag 700 (e.g., handbag) having integrated RF module 710. RF module 710 is shown to be integrated in strap 702, though it is understood that it may be integrated elsewhere within bag 700 (e.g., a specifically designed pocket). Placing RF module 710 in strap 702 (as opposed to within bag 700) may advantageously enhance the transmission and reception capability of RF module 710. In another embodiment, a pouch or other retaining device or article capable of containing a RF module may be attached (e.g., clipped) to bag 700.

As indicated above, RF modules according to the invention may be constructed in a single or multi-part construction. FIG. 7A shows a RF module of single part construction integrated within strap 710, whereas FIG. 7B shows a RF module of multi-part construction integrated within strap 724 of bag 720. In bag 720, communications circuitry portion 732 may be integrated within strap 722 and battery portion 734 may be retained within bag 720 in a predetermined location. Cable 736 may electrically couple circuitry portion 732 and battery portion 734. Battery portion 734 may be removed from the bag for replacement or to be recharged, depending on the type of energy storage device contained in battery portion 734.

Figure 7D:
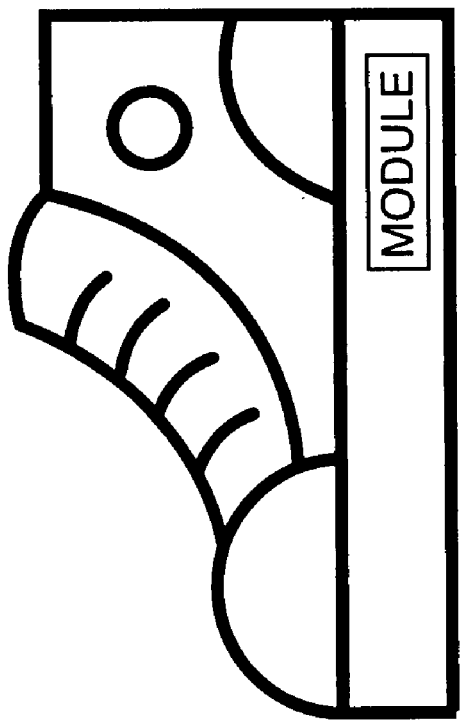
Figure 7C:
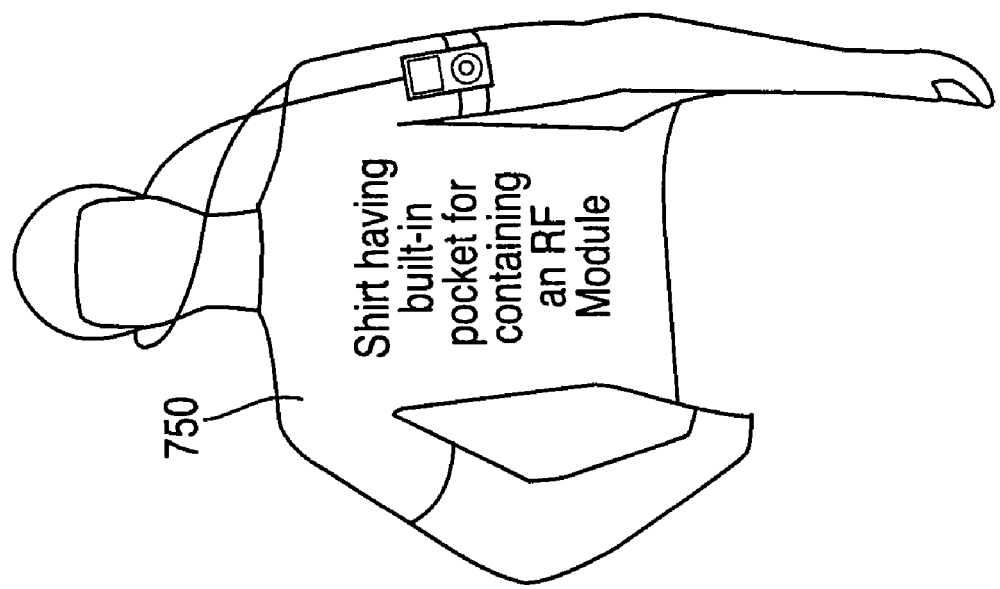

FIG. 7C shows an article of clothing 750 having a built-in pocket for containing a RF module according to an embodiment of the invention. The pocket (not shown) may be located in a region of the article so that when the RF module is contained therein, it is in a position that may maximize transmission and reception efficiency.

FIG. 7D shows a shoe containing a RF module in accordance with an embodiment of the invention. The RF module may be located in a region of the shoe so that when the RF module is contained therein, it is in a position that may maximize transmission and reception efficiency.

Referring back to FIG. 6, a RF module may be placed in a strategic location within house 620, for example, near a window or on an upper floor. As also shown, a RF module may be placed in car 630 or office 640. An advantage of using RF modules in accordance with the invention is that a user need not carry a RF module on his or her person where ever he or she may go, but may keep a RF module at one or more locations. Thus, when a user is in one of those locations (e.g., house 620, car 630, office 640), the host device may establish a short range communications network with the RF module to access the RF module's long-range communications protocol.

Because it is possible to keep RF modules in several different locations, it may be desirable for each RF module to be configured to identify or authenticate itself by the same identification information to a communications source (e.g., a wireless service provider). This identification information may be stored, for example, by the host device, which may provide the identification information to the RF module.

A number of approaches may be used to provide identification information to the RF module device. In one approach, the host device may provide the identification information to a RF module each time it establishes short range communication with the module. Such an approach may be suitable for use in connection with "public" RF modules, which may be modules accessible by any host device in short range communication with the module. When the host device is in communication with a public module, a user may use the host device to, for example, place and receive calls. The public RF module may temporarily store a host device's identification number, for at least the duration which the host device is in communication with the RF module. Storing the number can enable that RF module to receive and relay calls to a host device.

In another approach, the host device may transmit identification information during an initial short range communications negotiation, after which, the host device need not transmit identification information again. This approach may be useful to initialize "private" RF modules, which may be specifically dedicated for use by one or more predetermined users. Initializing RF modules advantageously eliminates a need for a potentially time consuming transmission of identification information each time a host device negotiates a connection with a RF module. After initialization, each RF module is primed and ready to provide the host device access to a long-range communications protocol.

In another approach, the RF module may receive identification information from a device other than the host device. For example, the RF module may interface with a computer (e.g., by a wired or wireless connection) and receive identification information. In another example, a circuit containing identification information may be installed in the RF module.

Figure 8:
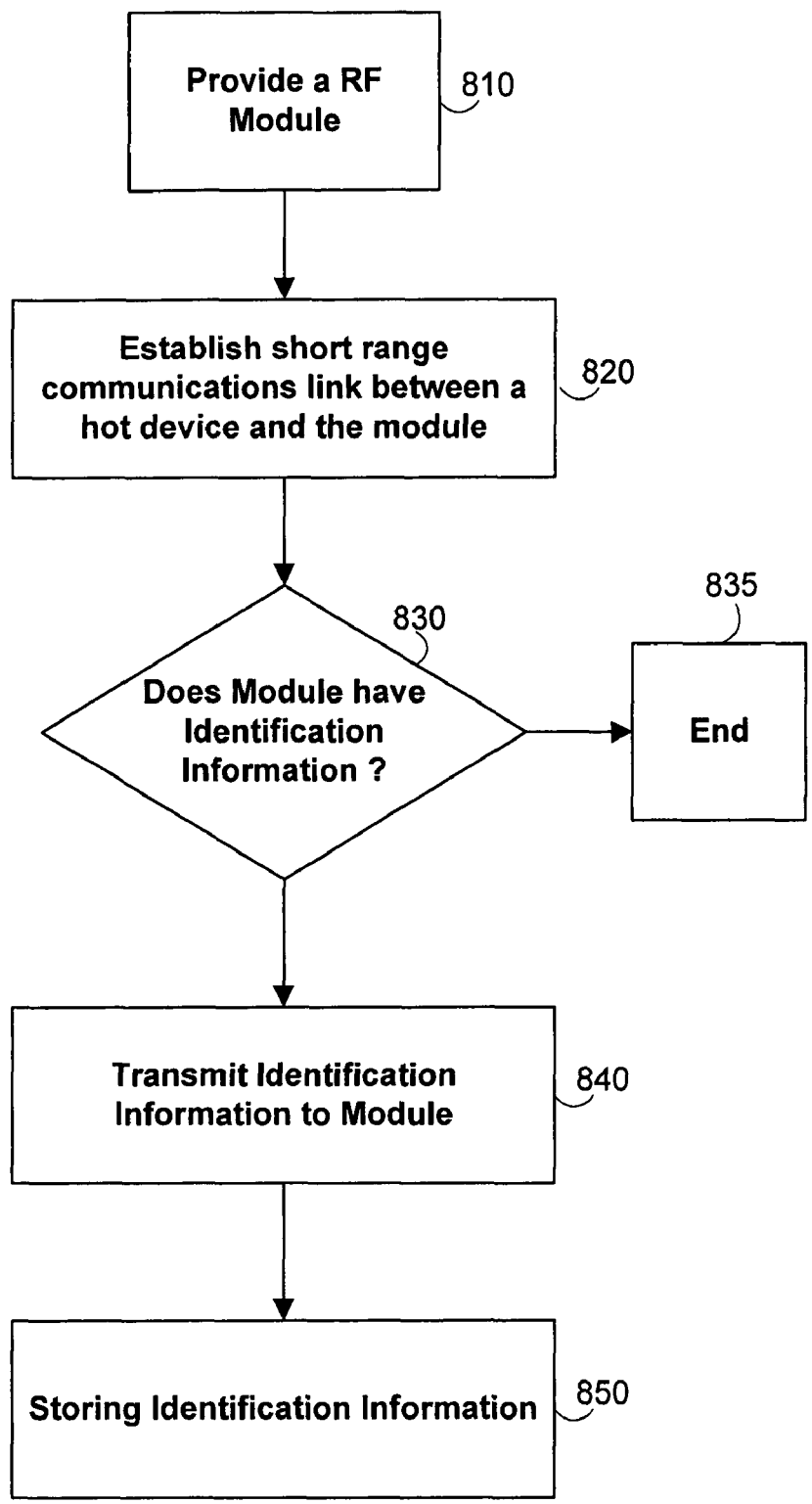
FIG. 8 shows a flowchart illustrating steps that can be taken to provide a RF module with identification information in accordance with an embodiment of the invention.

FIG. 8 shows a flowchart illustrating steps that may be taken to provide a RF module with identification information. Starting at step 810, a RF module can be provided. At step 820, a short range communications link between a host device and the RF module can be established. At step 830, a determination can be made as to whether the RF module has identification information. If it does have the information, then the process may end at step 835. If it does not have the information, then the process may proceed to step 840, at which point, the identification information may be transmitted to the RF module from the host device. At step 850, the identification information may be stored, for example, permanently or temporarily, within the RF module.

The host device may obtain the identification information in a number of different ways. In one approach, it may obtain the information from a computer (e.g., a user's personal computer). Using a computer, the user may download identification information from, for example, a wireless provider or other identification information source. If the user has an account with the wireless provider, the wireless provider may provide information to the host device that may otherwise only be included in the user's wireless phone. In some embodiments, the user may be required to purchase identification information. Such purchases may be performed over the internet or other public network. In another approach, a host device may be provided with identification information from a business computer or kiosk. It should be understood that in some embodiments, a RF module may receive identification information directly from a source other than a host device. For example, a RF module may interface with a personal computer or kiosk and receive identification information.

In another approach, the host device may retrieve identification information from the user's wireless telephone. When the identification information is retrieved, it may be provided to each RF module. The host device may wirelessly provide the identification information to the RF modules or a wired connection may be established between the host device and each module.

Figure 9:
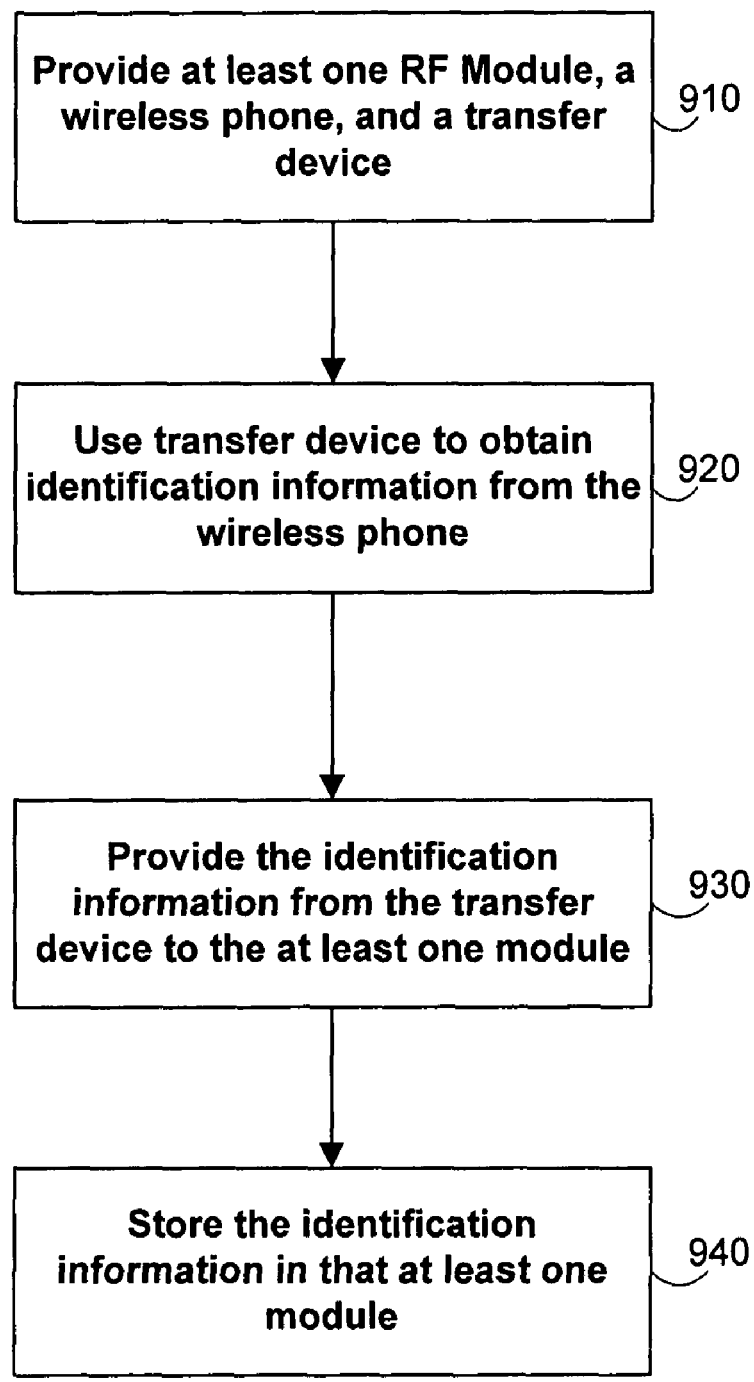
FIG. 9 shows a flowchart illustrating steps that can be taken to store identification information on a RF module in accordance with an embodiment of the invention.

FIG. 9 shows a flowchart illustrating steps that may be taken to store identification information on a RF module in accordance with an embodiment of the invention. Starting at step 910, at least one RF module, a wireless phone, and an information transfer device are provided. The information transfer device may be a host device, computer, or other suitable device. At step 920, the transfer device is used to obtain identification information from the wireless telephone. The transfer device may interface with the wireless device using a short range communications protocol or a wired link. At step 930, the identification information from the transfer device is provided from the transfer device to the at least one RF module. In effect, each RF module assumes the identity of the user's phone, advantageously providing a long-range communications device that may operate more efficiently (e.g., have longer operating life) than its wireless phone counterpart. At step 940, the identification information may be stored in at least one RF module.

Figure 10:
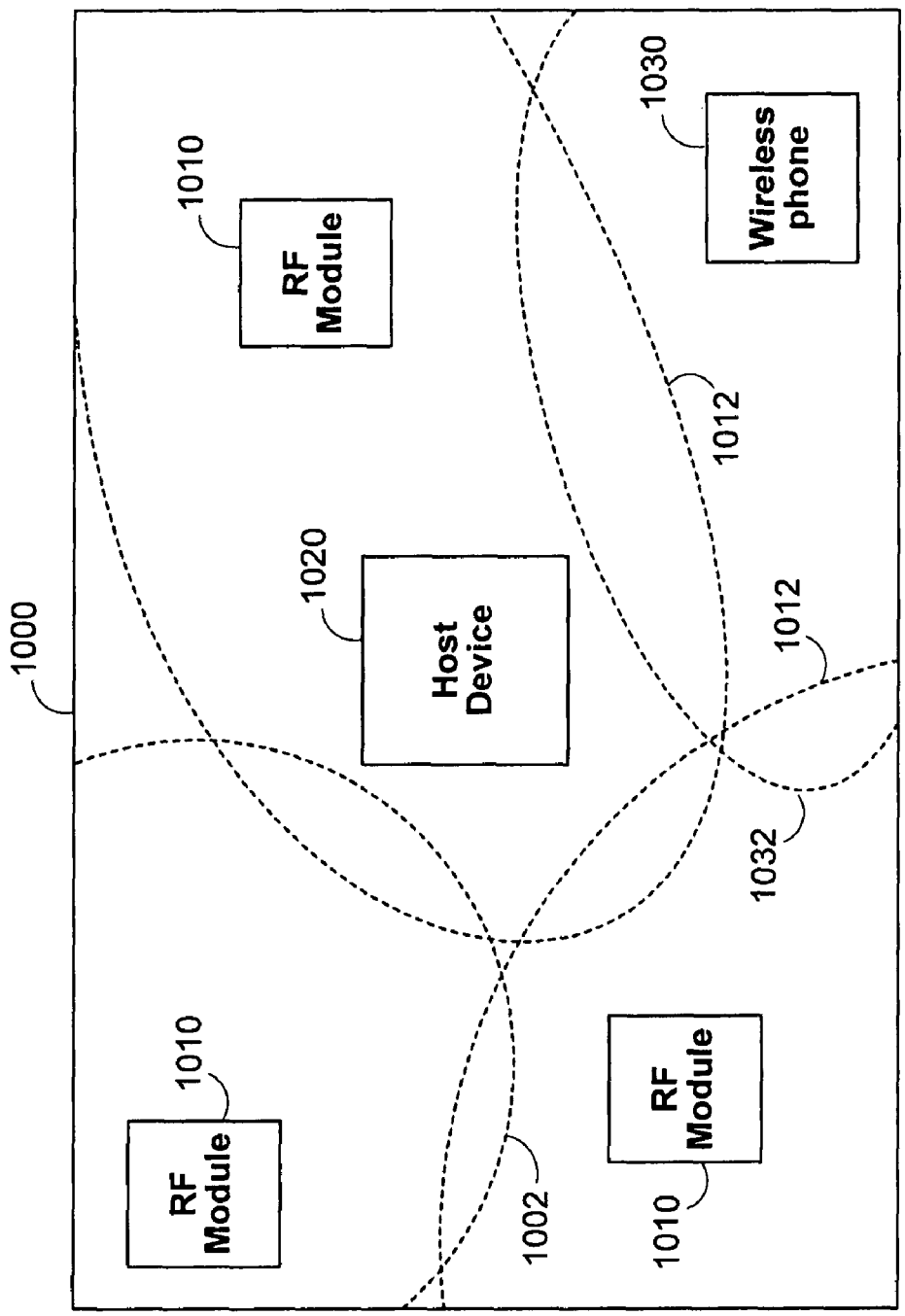
FIG. 10 shows an example where several RF modules may be located in different predetermined locations within a structure in accordance with an embodiment of the invention.

FIG. 10 shows an example where several RF modules 1010 may be located in different predetermined locations within structure 1000 in accordance with an embodiment of the present invention. The structure may be sufficiently large enough in size to warrant the need for more than one RF module, as one module may not provide sufficient short range network to ensure that it can be accessed by a host device anywhere within the structure. Each RF module 1010 may provide a short range network, as indicated by dashed lines 1012. Thus, when host device 1020 is within a short range network 1012 of a particular module, it may communicate with that module. If desired, wireless phone 1030 may be provided within structure 1000, in addition to RF modules 1010, and may provide a short range network 1032 that may be accessed by host device 1020.

There may be times when host device 1020 is able to communicate with two or more RF modules. During such times, host device 1020 may determine which module to communicate with, depending on a given number of factors, including, for example, monitored signal strength. In some embodiments, the host device may switch from one module to another (or a wireless phone) while maintaining a telephone connection as the host device is moved from one region (where the host device can communicate with a first module) to another region (where the host device can communicate with a second module but not the first module).

Each RF module can simultaneously support multiple host devices each conducting its own communications event (e.g., telephone call). Such RF modules may be used to setup a network (such as a citywide network, a business network, a conference center network, or a home network) for enabling multiple host devices to access any one of the modules. The host device can communicate with the RF module using a short-range communications protocol and the RF module can communicate with a communications source (e.g., cellphone tower) using a long-range communications source.

When several RF modules are available for communicating with a host device, such as that shown in FIG. 10 or in a city wide network (or other relatively large scale network) of RF modules, the host device may select which RF module it communicates with based on one or more different attributes. For example, attributes may include geography, short-range communications protocol signal strength, long-range communications protocol signal strength, power source, available power levels, access rights, bandwidth availability, and any combination thereof. Using geographical attributes, the host device may select the closest RF module. Some RF devices may be powered by a fixed supply source (such as a battery) or an unlimited supply source (such as utility power). Given a choice between using a fixed or unlimited supply source, the host device may select the RF module powered by the unlimited power source to preserve the power supply in the fixed power source. Given a choice between RF modules powered by fixed power sources, the host device may select one of the modules based on available power levels of the fixed supply sources.

The host device may weigh certain attributes more heavily than others when determining which RF module to select. For example, signal strength may be a more important attribute than power source. The weights accorded to each attribute can by set by a user or by the host device.

Figure 11:
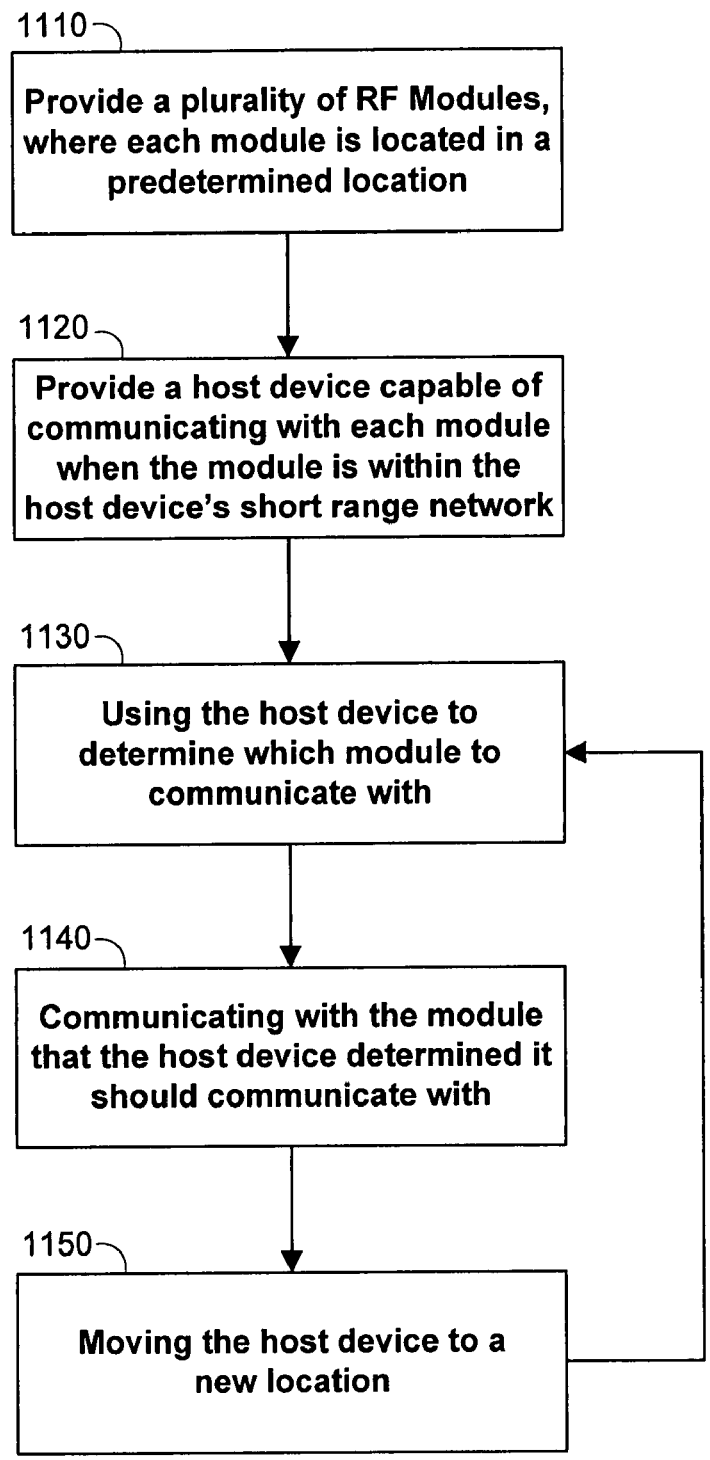
FIG. 11 shows a flowchart of steps that can be taken to determine which RF module a host device communicates with in accordance with an embodiment of the invention.

FIG. 11 shows a flowchart of steps that can be taken to determine which RF module a host device communicates with in accordance with an embodiment of the present invention. Starting at step 1110, several RF modules can be provided, where each RF module can be located in a predetermined location. For example, several modules may be placed within a single structure or the modules may be dispersed among many different and independent locations such as in a car, home, and office. At step 1120, a host device capable of communicating with each module, when the module is located within the host device's short range network, can be provided. At step 1130, the host device can be used to determine which RF module to communicate with using a short range communications protocol. In some embodiments, in addition to the RF modules, a wireless phone may be included as one of the devices the host device can communicate with using a short range protocol. After this determination is made, the host device can communicate with the module determined to be the optimal module for short range communication, as indicated at step 1140.

At step 1150, the host device is moved to a new location. For example, the host device may be moved from a car to a home. As another example, the host device may be moved to a new location within a structure. After the host device is moved, steps 1130 and 1140 are repeated. If, after the move, the host device detects another RF module with which it can establish a better short range communications link, it may begin communicating with that new RF module.

There may be times when the host device can communicate with more than one RF module or a cellphone. In these situations, the host device may decide which long-range communications device to use. For example, the host device may weigh preference factors (as previously disclosed above) to determine which long-range communications device to use.

An advantage of the invention is that the host device can provide a user interface and run software that are superior to that which may exist on a wireless phone. In addition, because wireless phones are constantly being redesigned to have different interfaces and operating software, which require users to become acquainted therewith each time they acquire a new phone, embodiments of the present invention eliminate the need for a user to learn how to use such features by enabling a user to use the familiar and easy to use interface and software of the host device. That is, the host device provides an intuitive interface for accessing telephone-related features (e.g., contacts, text messaging, calls, calendar, photos, and options), regardless of whether the host device is communicating with a wireless phone or RF module.

Another advantage of the invention is that users may access telephone-related features using the host device without the host device being physically connected to a device that provides access to long-range communication. That is, the user is not encumbered with handling the device having the long-range communications circuitry when accessing telephone-related features. This provides a trouble free and pleasant experience for the user.

The host device may locally store all the data and software necessary for enabling the host device to provide telephone-related features. The data and software may be part of the host device's original OEM programming or may be provided to the host device in a software update. In other approaches, contact information, calendar information, task information, and other information that may, for example, be updated on a regular basis may be provided to the host device. For example, such information may be provided when the host device communicates with a host computer, which may be a source of this information. When the host device and host computer are communicating, a synchronization process may commence to update the information stored on the host device such that it matches the information stored on the host computer. It is understood that communication between the host device and host computer may take place on a wired or wireless link.

In embodiments where the host device communicates with a RF module, the host device may provide the user interface for enabling a user to access features typically provided by wireless telephones (e.g., contact list, text messaging editor) and other features that may or may not be included with a wireless phone (such as a web browser or an online store interface for ordering media (e.g., songs, movies, and tv shows)). That is, the host device may be the only source of a user interface for accessing the long-range protocol of the RF module.

Figure 12:
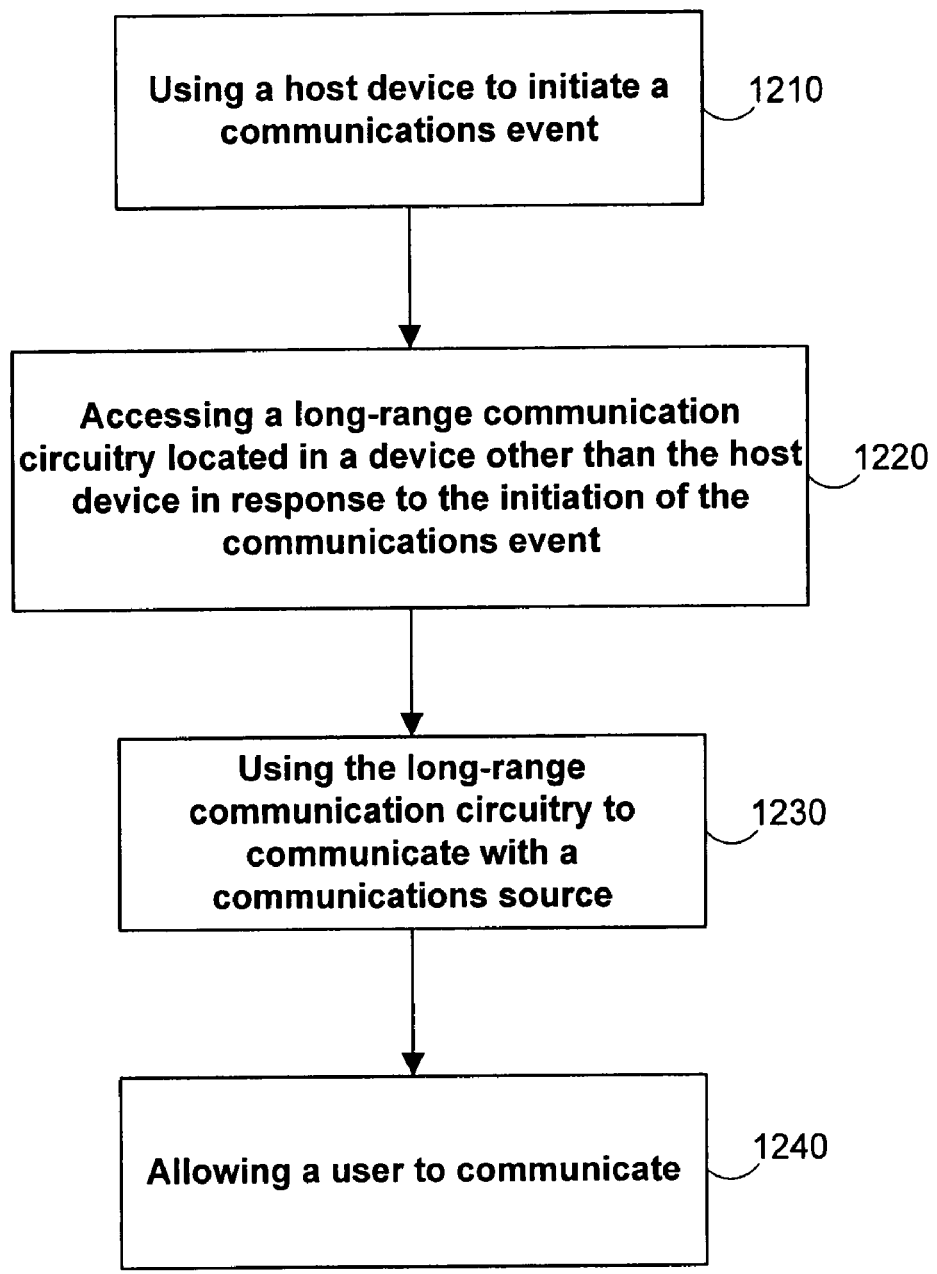
FIG. 12 shows a flowchart illustrating transmission of a communication event device in accordance with an embodiment of the invention.

FIG. 12 shows a flowchart illustrating transmission of a communication event device in accordance with an embodiment of the invention. A communications event can be an event involving an act of transmitting data from the user (which may include the user's host device and long-range communications device (e.g., wireless phone or RF module)) or receiving data from another source (e.g., a communications source or another user's phone or host device). The data can include data for voice (e.g., telephone calls), text messages, emails, media such as audio files (e.g., songs or ringtones) and videos, and other suitable media requiring use of a long-range communications protocol.

Beginning at step 1210, a host device can be used to initiate a communications event. For example, referring briefly to FIG. 12A, which shows an illustrative contacts list screen 1280, a user may access contacts using the user interface of the host device to, for example, call a particular person. If desired, a user may use a peripheral device that is wirelessly or physically coupled to the host device to initiate a communication event. For example, a user may have a watch that can display a list of contacts and allows the user to select one of the names in the contact list to initiate a phone call.

In response to initiation of the communication event, long-range communications circuitry located in a device other than the host device can be accessed, as indicated by step 1220. The other device containing the long-range communications circuitry may be a wireless phone or RF module.

At step 1230, the long-range communications circuitry can be used to communicate with a communications source (such as communications source 150 of FIG. 1). When communication is established between the long-range communications circuitry and the communications source, data may be transmitted from and received by the long-range communications circuitry. Thus, data received may be provided to the host device and data transmitted may be provided by the host device. Such communication may allow a user to communicate, as indicated by step 1240. The user may participate in the communication event by directly using the host device, using a headset wirelessly or physically connected to the host device, or using a peripheral device.

The order of the steps disclosed in FIG. 12 are not fixed and that the steps may be performed in a different order depending, for example, on which communications event is being initiated. For example, if a user desires to transmit a text message or email or other media that does not require real-time two way communications, the host device may not access the long-range communications circuitry until after the user enters a command to send the text message or email. In this example, step 1240 may be performed before steps 1220 and 1230 are performed.

Figure 13:
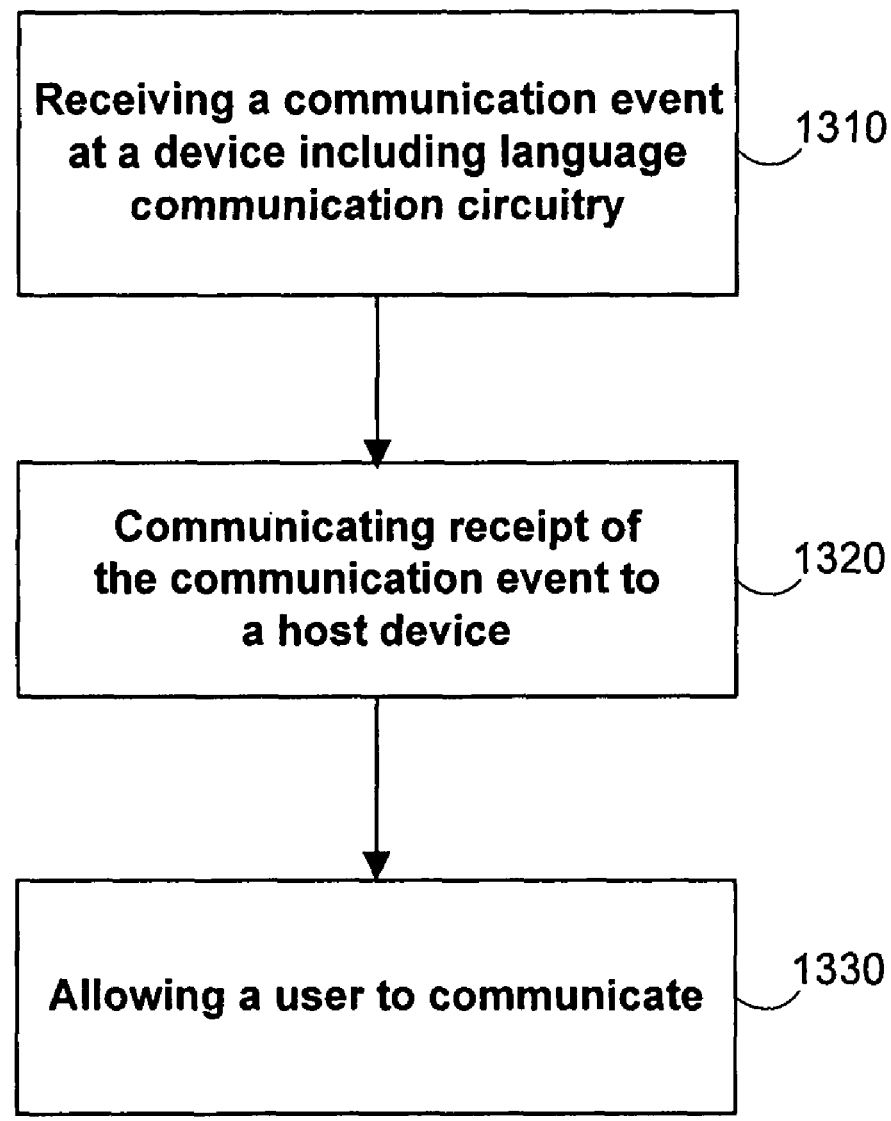
FIG. 13 shows a flowchart illustrating receipt of a communications event in accordance with an embodiment of the invention.

FIG. 13 shows a flowchart illustrating receipt of a communications event in accordance with an embodiment of the invention. Starting at step 1310, a communications event (e.g., email, text message, telephone call) can be received at a device including long-range communications circuitry (e.g., a wireless telephone or a RF module). At step 1320, receipt of the communication event can be communicated to a host device, which can be a device that does not include long-range communication circuitry. For example, if the communication event is a telephone call, the host device may display the number or the name (and picture) of a person corresponding to the caller and provide the user with the option to accept the call. As another example, if the communication event is a text message, the host device may indicate who sent the message and provide the user with the option to read the email. The device, including the long-range communication circuitry, may use short range communications circuitry to communicate with the host device.

At step 1330, a user may be allowed to communicate. Some interactions such as phone calls may require continuous exchange of data between the long-range communications circuitry and a communications source whereas other interactions such as text messaging may only require discreet data exchange intervals. The user may interact with the communications event by directly using the host device or a peripheral device wirelessly or physically coupled to the host device. For example, if the event is a call, the user may accept the call and commence conversation with the other party. The user may accept the call by, for example, pressing a button on the host device or a peripheral device (such as a watch). Alternatively, the user may press a button associated with a headset physically or wirelessly connected to the host device to accept a call. If the communications event is an email or text message, the user may respond using a keyboard peripheral device.

Figure 14:
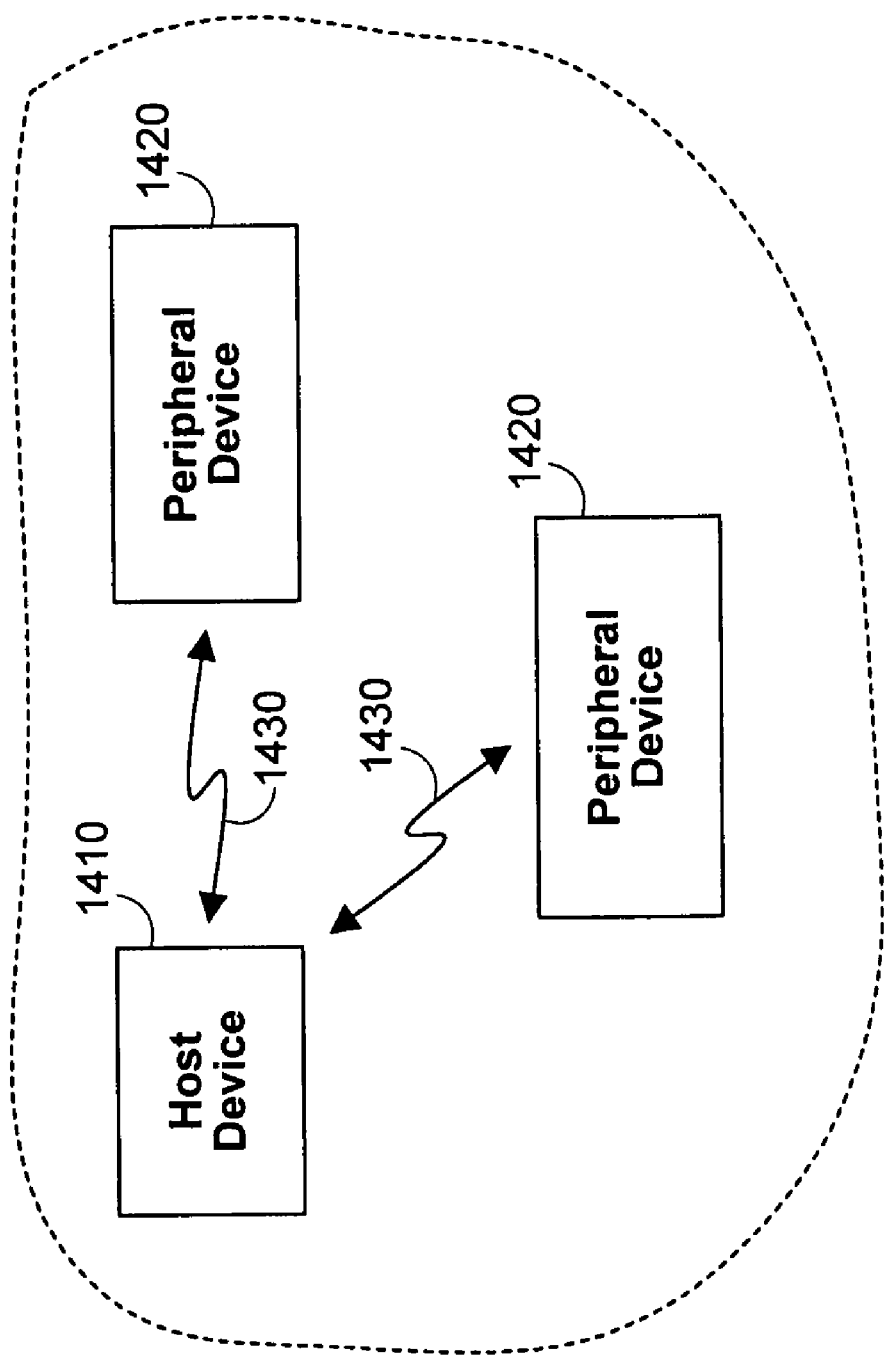
FIG. 14 shows a simplified block diagram of a host device interfacing with a peripheral device in accordance with an embodiment of the invention.

FIG. 14 shows an illustrative block diagram of a personal area network wirelessly interconnecting host device 1410 and at least one peripheral device 1420 in accordance with an embodiment of the present invention. Peripheral device 1420 may include circuitry for wirelessly communicating with host device 1410 using a short range communications protocol over path 1430. Peripheral device 1420 is not a wireless phone or a RF module, but a device that may enable a user to access features of host device 1410 without having to touch or view host device 1410. This advantageously enables the user to keep host device 1410 in a pocket or other relatively inaccessible location, yet still be able to interact with host device 1410.

In some embodiments, peripheral devices 1420 may be conventional artifacts such as watches, jewelry, a button such as a shirt or coat button, and articles of clothing that include at least an interface and short range communications circuitry. In watches, for example, an LCD screen may be included to display information (e.g., which song is playing, a name in a contact list, or a person calling) relating to host device 1410. It may be desirable for the interfaces that control host device functions to be discreet.

In other embodiments, peripheral devices may include user input device such as keyboards and mice, display devices such as CRTs and LCDs, and output devices such as printers, all of which may be in a wireless or physical communication with the host device.

It should be understood that although peripheral devices are discussed in context with a host device, peripheral devices according to embodiments of the invention may be used in connection with a telephone including circuitry for handling short range communications such as a phone with Bluetooth technology. It is further understood that various other signal transmission mediums such as fabric and skin (e.g., the skin of a live human) may be used to exchange signals between peripheral and host devices.

Figure 15:
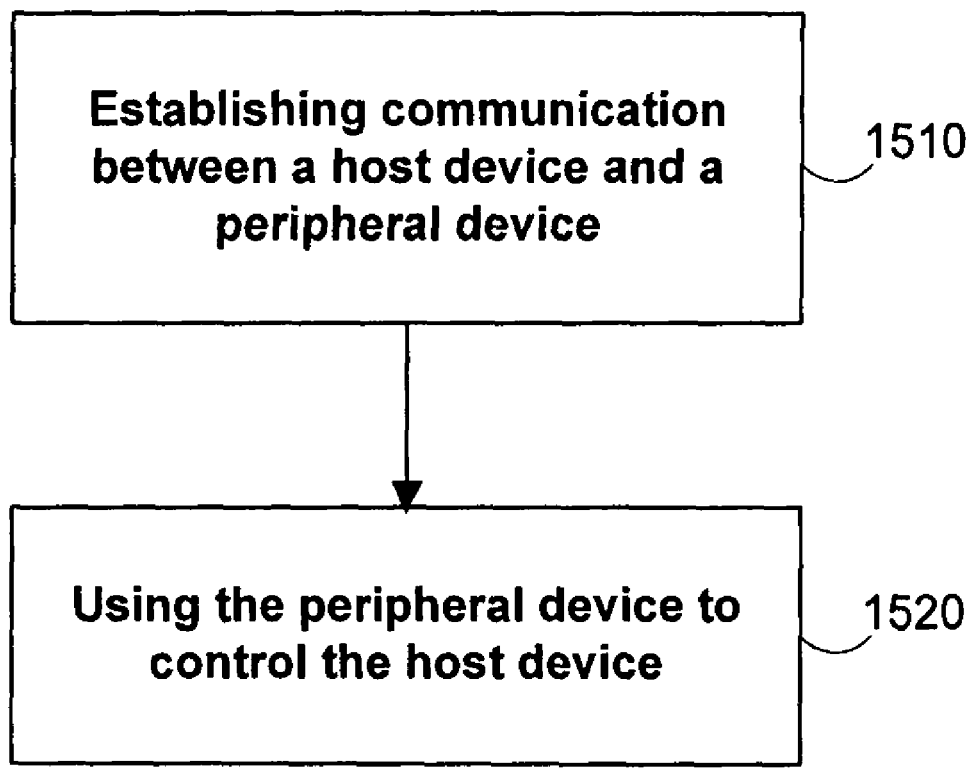
FIG. 15 shows a flowchart showing steps for using a peripheral device in accordance with an embodiment of the invention.

FIG. 15 shows an illustrative flowchart for using a peripheral device in accordance with an embodiment of the invention. Beginning at step 1510, communication can be established between a host device and a peripheral device. The communication can be a wireless communication implemented using a short range communications protocol. Establishment of communication between a host device and a peripheral device can be referred to as pairing of devices.

At step 1520, the peripheral device can be used to control the host device. For example, if the host device is playing music, the peripheral device may control playback of the music, including controlling the volume. In some embodiments, the peripheral device may include a display to indicate to the user which song is being played back. In some embodiments, the peripheral device can provide a simplified version of the interface that may be available on the host device.

In another example, if the peripheral device instructs the host device to perform an action requiring the use of a long-range communications protocol, the host device may access the long-range communications circuitry of a wireless phone or a RF module to perform the desired action.

The personal area network existing between a host device and a device including long-range communications circuitry may be used in many different applications and environments, one of which may be an automobile. Many automobiles have stereo systems that include a docking system for physically connecting the stereo system to a host device (e.g., via an audio output jack of the host device). Many aftermarket kits are available to fit stereo systems with the necessary hardware to interface with a host device for those cars lacking the necessary equipment. Some of these aftermarket kits include a cable that can provide charging and serial data communications.

Some automobiles may be outfitted with a carphone or CB system. Carphones and CB systems are different from the host device and long-range communications device of the present invention for at least the reason that earphones and CB system cannot be easily upgraded over a network. That is, the host device may receive direct user interface upgrades over a connection (whether wired or wireless) and is not constrained by the RF communications circuitry. Another difference is that earphones and CB systems require relatively high power and substantial antennas to operate.

Figure 16:
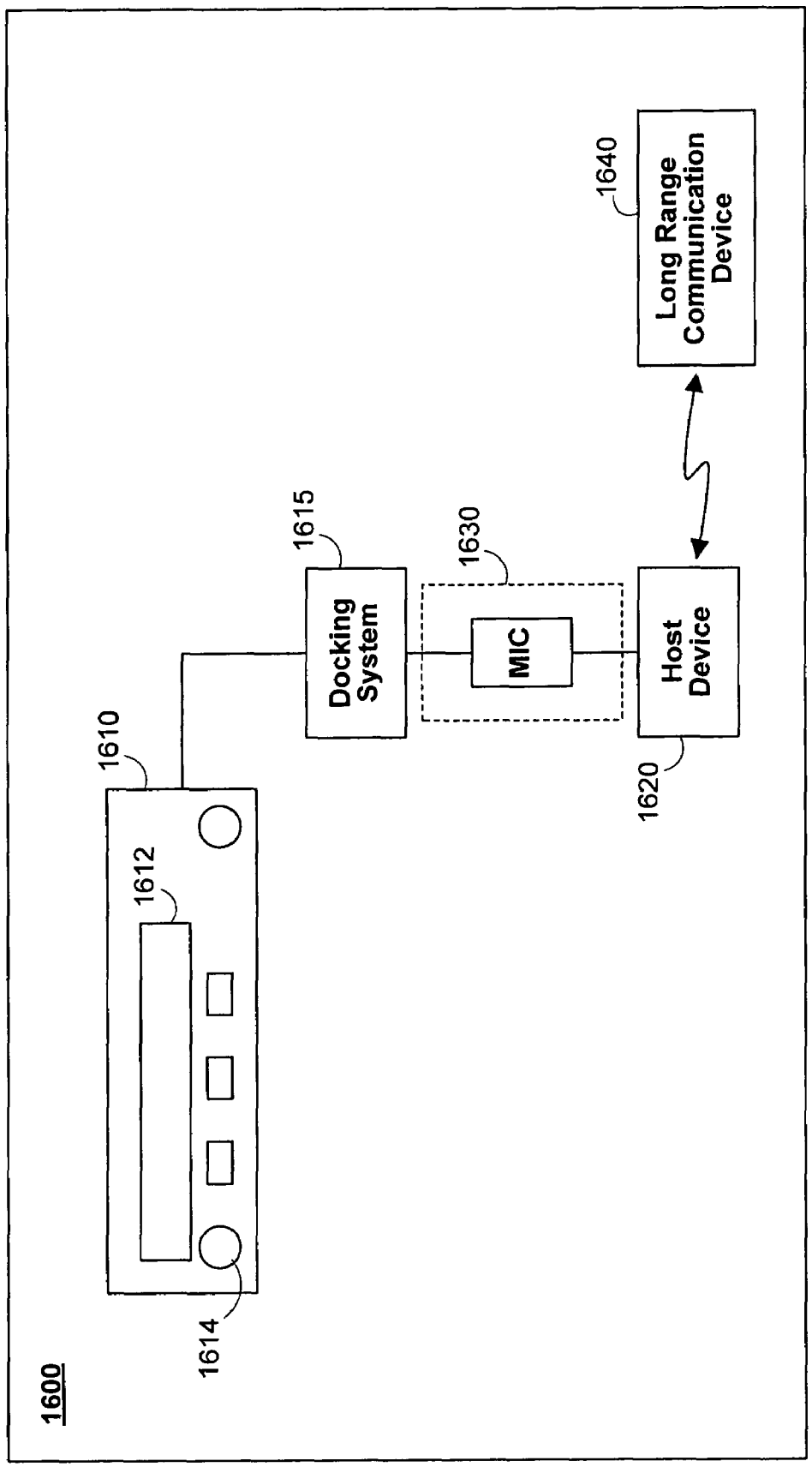
FIG. 16 shows a simplified block diagram of an automobile stereo interfacing with a host device in accordance with an embodiment of the invention.

FIG. 16 shows a simplified illustrative block diagram of an automobile stereo interfacing with a host device in accordance with an embodiment of the invention. Automobile 1600 can include stereo 1610 with docking system 1615. Host device 1620, stereo cable with microphone 1630, and long-range communications device 1640 can be placed in automobile 1600, but are not necessarily permanent fixtures of the automobile. Cable with microphone 1630 can connect host device 1620 to docking system 1615 to allow audio signals (for playing music through the automobile's stereo system) and data signals (e.g., for displaying contact information or song information on the stereo display screen) to be processed by stereo 1610. That is, stereo system 1610 may process signals provided by host device 1620. In addition, stereo 1610 may provide signals to host device 1620 in response to user inputs (e.g., accept call or end call inputs) to stereo 1610. The microphone included with cable 1630 may be used to receive audio signals (from the user) and provide those signals to host device 1620.

The microphone need not be included with the cable and may be provided elsewhere within automobile 1600. For example, stereo system 1610 may have a microphone which may provide received audio signals to host device 1620. As another example, the microphone may be separately attached—in addition to a cable connecting to the stereo system—to host device 1620. In yet another example, a microphone may be in wireless communication with host device 1620.

Host device 1620 may be the host of a personal area network which includes long-range communications device 1640. Device 1640 may be a wireless phone or a RF module and provides host device 1640 access to a long-range communications protocol. One of the advantages of the personal area network/automobile configuration shown in FIG. 16 is that a user may be able to participate in a telephone call using the stereo system and a cable with a microphone, without requiring the automobile to have a local area network (e.g., Bluetooth circuitry) for communicating directly with a phone or having a built-in phone. In some embodiments, the microphone may be integrated within host device 1620 or in stereo system 1610.

Stereo system 1610 may include a display 1612 for displaying information. The display may be relatively simple single line of text display or a full color LCD panel, and in some embodiments an interactive LCD display. In other embodiments, display may be heads up display or may be integrated into the dashboard of the car. The information may be provided by host device 1620. The information may include, for example, information stored locally on device 1620 or obtained from a communications source by way of long-range communications device 1640. Information that may be displayed include song information such as artist, song title, album title, and album art, contact information such as names and numbers of contacts, whether the numbers are work, cell phone, or home numbers, email addresses, calendar information, travel information such as travel directions, GPS location information, and maps, weather information, and any other suitable information. An advantage of using a long-range communications source is that the data provide such as map information may be relatively up-to-date (at least compared to DVD-based map programs) as it may be synched from the Internet or other public network.

Stereo system 1610 can include an interface 1614 for controlling host device 1620. Interface 1614 allows a user to access features of host device 1620 without requiring the user to fumble around for host device 1620, which can potentially make for dangerous driving conditions. The interface may be access on the stereo system directly, on the steering wheel, a remote device, or some other control mechanism located in the car. Display 1612 may display content to assist the user in navigating through host device 1620 using interface 1614.

An example is discussed describing use of the system shown in FIG. 16. Stereo system 1610 may be playing music provided by host device 1620. While the music is playing, a call may be received by device 1640, at which point host device 1620 may stop or fade away playback of the music and notify user of the incoming call. Host device 1620 may notify user of the incoming call by, for example, displaying the phone number or the caller's name on the stereo display screen and cause stereo system 1610 to audibly notify the user of the call. The user may accept the call by, for example, pressing a button on stereo system 1610, host device 1620, cable 1630, or other button which may be interfaced with stereo system 1610 or host device 1620. When the call is accepted, the caller's speech may be played through the automobile's speaker system and the receiver's speech may be picked up by the microphone integrated with cable 1630. The call may be ended when the user presses the same button used to accept the call.

In another example, a device may receive location information that is displayed on stereo system 1610. This information may be used to provide travel directions to the user while the user is driving. In some embodiments, the user may be provided with a map and an indication of the automobile's location on the map. The location may be obtained using GPS circuitry located in device 1640, device 1620, or device 1610 or by using a triangulation technique using the long-range communications protocol.

Figure 17:
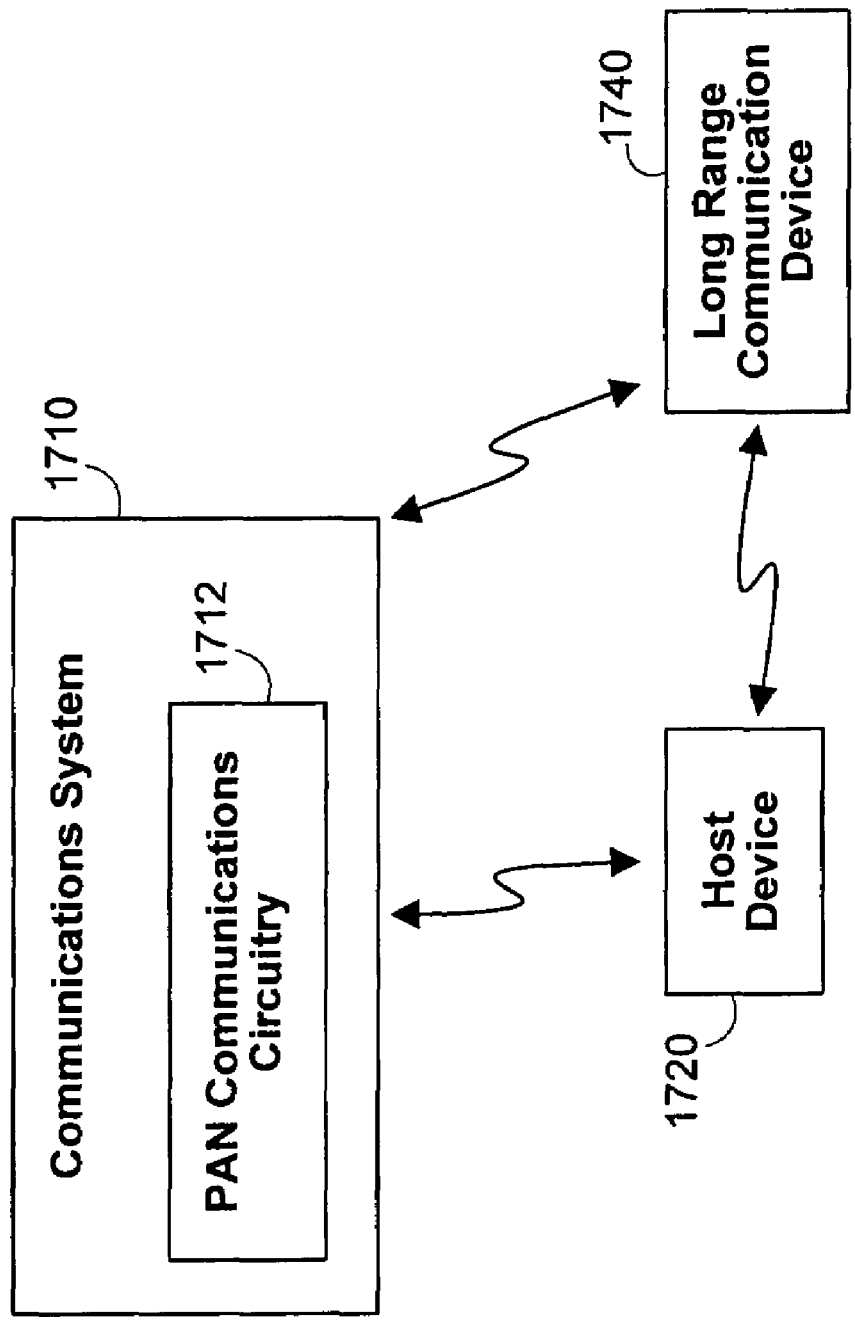
FIG. 17 shows a simplified block diagram of an all inclusive wireless system according to an embodiment of the invention.

FIG. 17 shows a simplified illustrative block diagram of a wireless system according to an embodiment of the invention. This system, as opposed to that discussed above in connection with FIG. 16, does not require use of a cable to provide data to, for example, a stereo system. As shown, FIG. 17 shows communications system 1710, host device 1720, and long-range communications device 1740. Communications system 1710 may include personal area network circuitry 1712 which may enable it to wirelessly communicate with host device 1720, long-range communications device 1740, or both. In one embodiment, communications system 1710 may be the communications system of an automobile and may include a stereo and microphone. In another embodiment, communications system 1710 may be a personal computer, which may include a built-in microphone or is capable of receiving a microphone via a jack connection.

During operation, host device may provide data to communications system 1710. The data may be locally stored data or it may be data provided from long-range communications source 1740. For example, host device 1720 may stream music to communications system 1710 for playback. In another embodiment, host device may provide telephone data received from device 1740 (and other data such as caller name) to system 1710 so that system 1710 can play back the music and display any relevant information. A microphone (not shown) may be used to receive sounds from a user and be provided to host device 1720, which may provide the received sound data to device 1740 for communication to a communications source (not shown).

In another embodiment, telephone calls may be handled using only communications system 1710 and device 1740, effectively bypassing host device 1720. For example, in an automobile environment, if device 1740 is a RF module, the module may be permanently kept in the automobile to provide telephony access.

Note that although FIG. 17 is discussed as a wireless communication system, one or more or all communications pathways may be wired or use some sort of physical connection.

Figure 18:
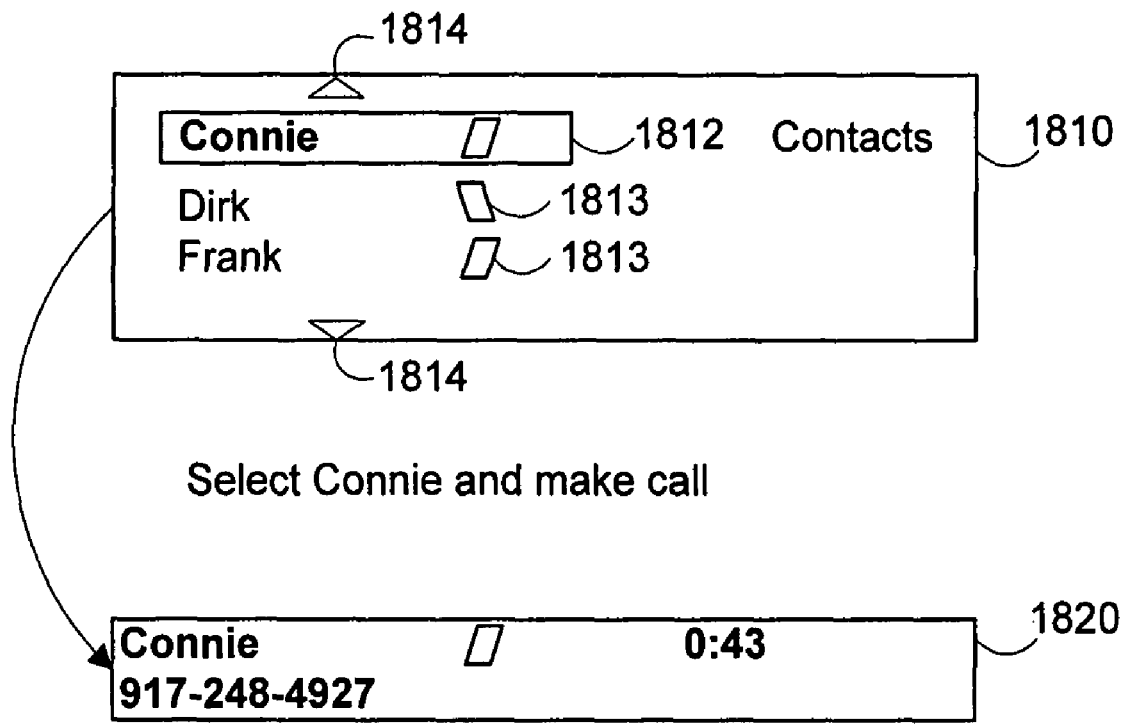
FIG. 18 shows an illustrative sequence of screen shots showing how a user may place a telephone call using an automobile stereo system in accordance with an embodiment of the invention.

FIG. 18 shows an illustrative sequence of screen shots showing how a user may place a telephone call using an automobile stereo system in accordance with an embodiment of the invention. The phone call may be placed using one of the systems discussed above in connection with FIGS. 16 and 17. Screen 1810 shows a list of contacts (which list may be supplied by a host device in communication with the stereo or communication system of the automobile) and a highlight region 1812 over one of the contacts. Information such as an icons 1813 (e.g., cell phone or work number icon) may be displayed adjacent to each contact. Indicators 1814 may be displayed to screen 1810 to indicate to the user that additional contacts are available. In screen 1810, highlight region 1812 is highlighting the contact for Connie. In response to selecting Connie by interacting with a user interface, screen 1820 may be provided.

Screen 1820 shows information relating to who is being called. For example, the name of the person being called and the number may be displayed, as shown. In addition, other information such as length of phone call may be displayed.

Figure 19:
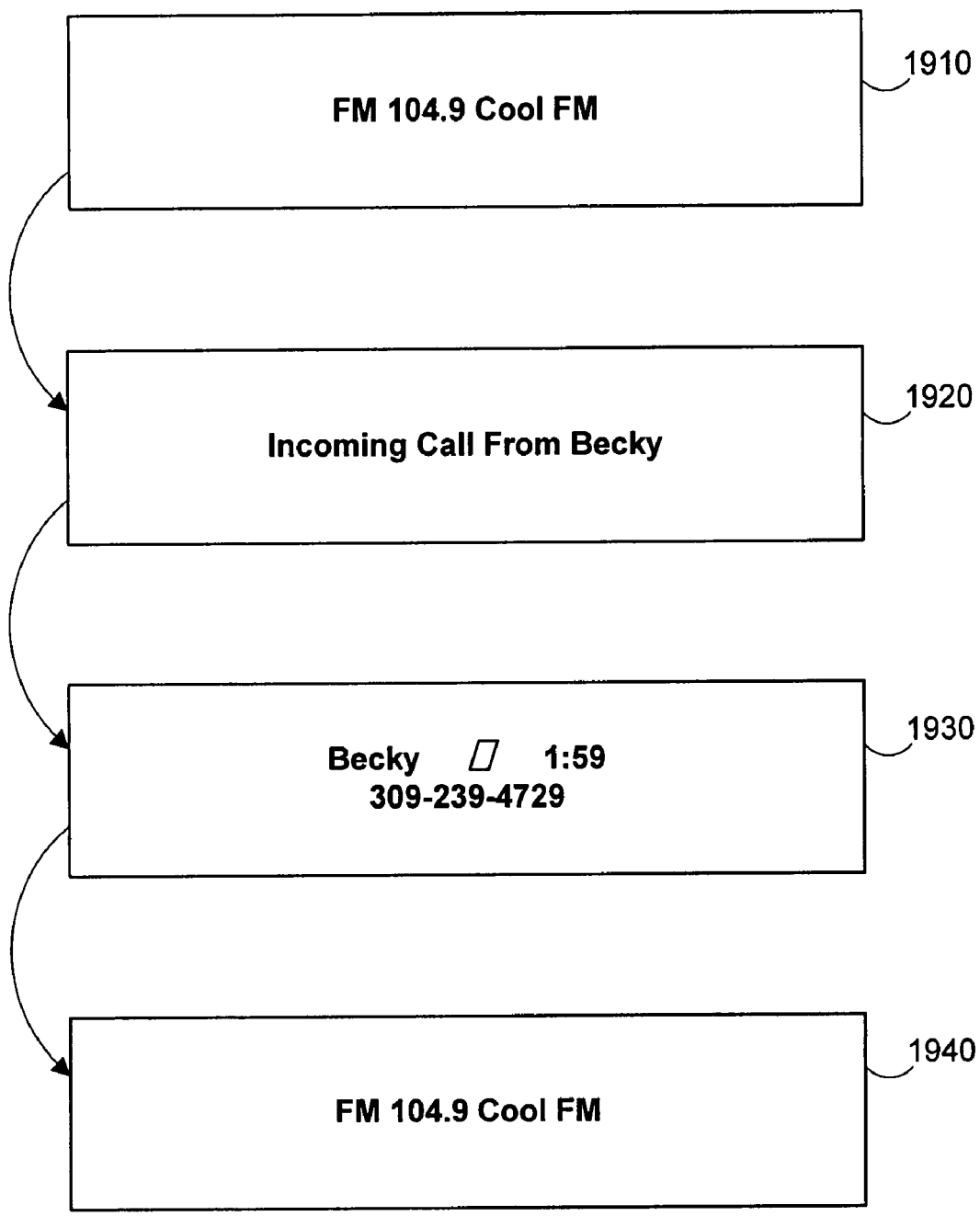
FIG. 19 shows an illustrative sequence of screen shots showing how a user may accept a telephone call using an automobile stereo system in accordance with an embodiment of the invention.

FIG. 19 shows an illustrative sequence of screen shots showing how a user may accept a telephone call using an automobile stereo system in accordance with an embodiment of the invention. The phone call may be accepted using one of the systems discussed above in connection with FIGS. 16 and 17. Screen 1910 shows information that may be displayed on a display screen (e.g., stereo display or a LCD display) in an automobile. In this example, the information indicates an FM radio station is currently being played. When a call is incoming, this communication event may be displayed to indicate to a user who is calling, as shown in screen 1920.

Assuming the user accepts the call, screen 1930 may be displayed. Screen 1930 shows the caller and the caller's number and other information such as talk time. When the phone call ends, the stereo system may resume displaying what was originally displayed prior to the call, as shown in screen 1940.

Figure 20:
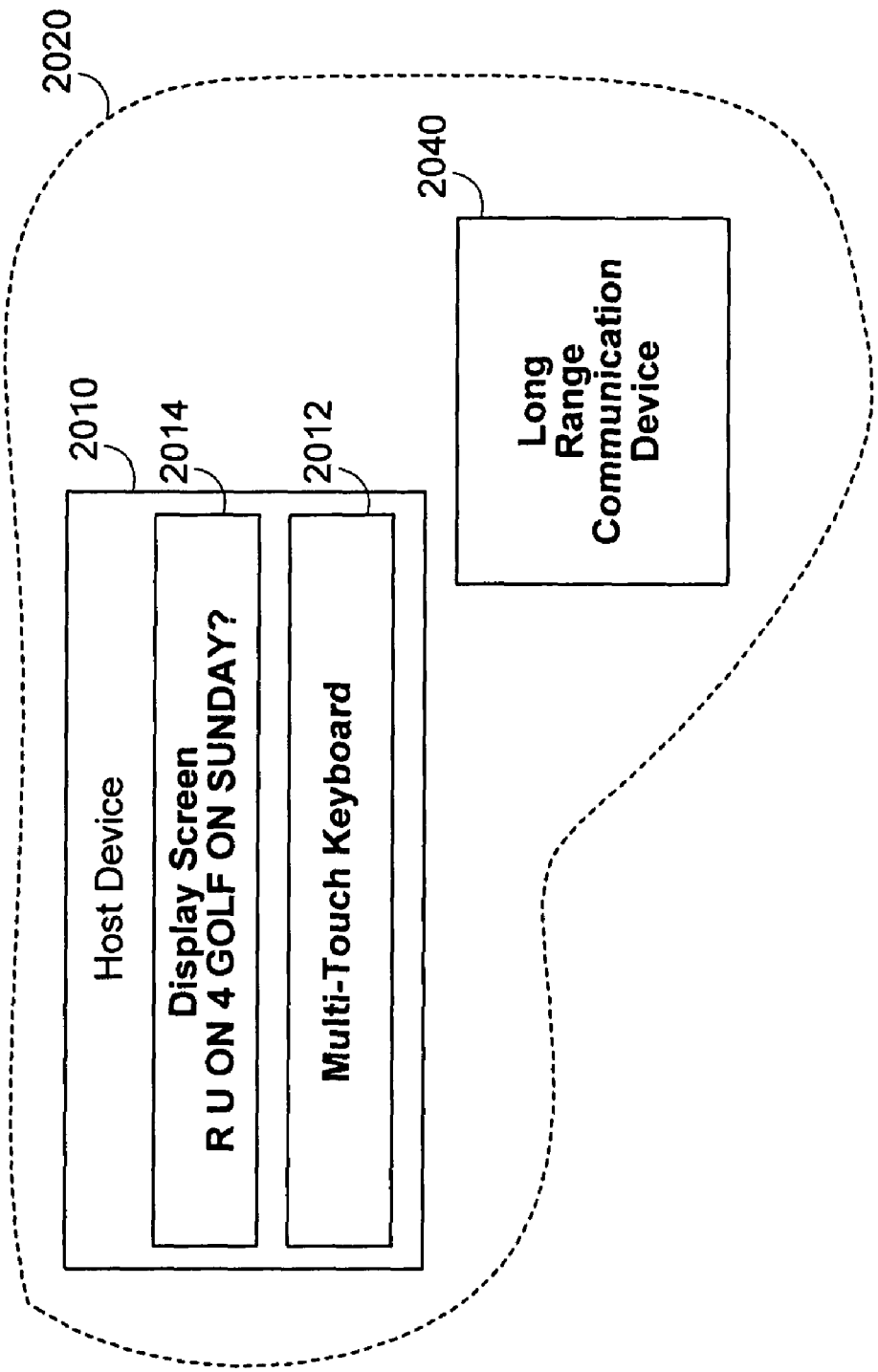
FIG. 20 shows a block diagram illustrating use of a host device to enter a message that is transmitted to a communications source using a long-range communication device in accordance with an embodiment of the invention.

FIG. 20 shows a block diagram illustrating use of a host device to enter a message that is transmitted to a communications source using a long-range communication device in accordance with an embodiment of the invention. Although cell phones enable users to send text messages (e.g., SMS text messages) to one or more people, the interface for typing such messages is generally constrained (e.g., by the 9 digit keypad of the phone or by bulky phones which have flip-out keyboards). An advantage of the invention is that host device 2010 may provide an interface that is easier to use and is not hampered by the clunkiness of a flip-out keyboard. In FIG. 20, the combination of host device 2010 and long-range communication device 2040 may allow a user to easily type messages such as text messages and emails which can be transmitted using a long-range communications protocol. Emails may be transmitted using a data layer existing on the long-range communications protocol.

In one embodiment, host device 2010 may include multi-touch screen 2012 and display 2014. An example of such a host device is disclosed in U.S. patent application No. 2006/0197753, which is incorporated by reference in its entirety. A user can type a message (e.g., a text message or email) using touch screen 2012 and send the message to a desired party via long-range communications device 2040. Device 2040 may be a cell phone or a RF module contained within personal area network (as indicated by dashed lines 2020) of device 2010.

Figure 21:
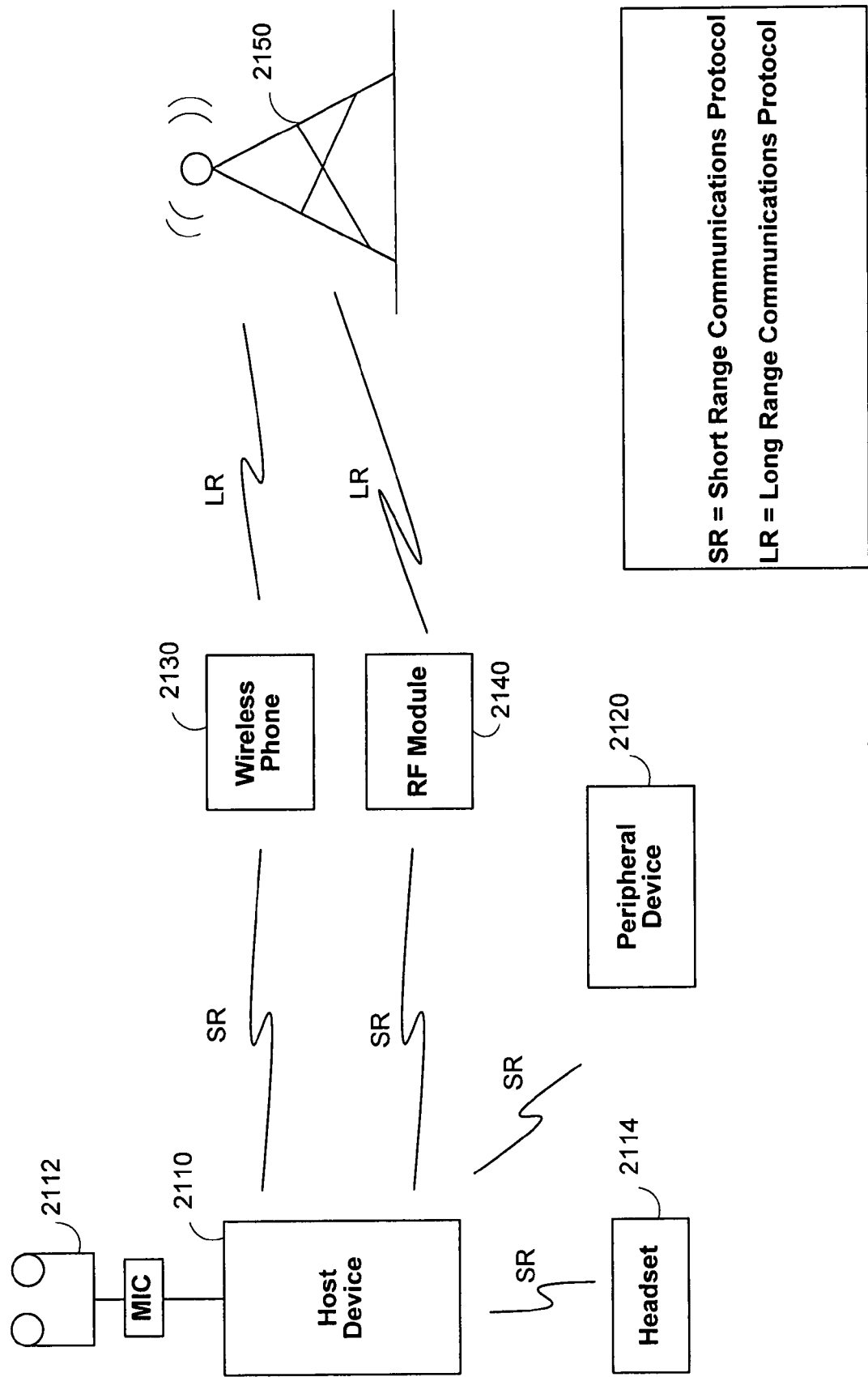
FIG. 21 shows an alternative block diagram to that shown FIG. 1 in accordance with an embodiment of the invention.

FIG. 21 shows an alternative block diagram to that shown in FIG. 1 in accordance with an embodiment of the invention. As shown, host device 2110 may be connected to wired headset 2112 or wireless headset 2114. Wired headset 2112 may include a microphone and at least one acoustic element (e.g., speaker). Wireless headset 2114 may include circuitry for communicating with host device 2110 over a short range communications protocol. Headsets may be dual-mode wired and wireless headsets such as those disclosed in "Wireless Communication Headset with Wired and Wireless Modes," filed under application Ser. No. 11/620,668 on Jan. 6, 2007.

Host device 2110 may communicate wirelessly with peripheral device 2120 over a short range communications protocol. Host device 2110 can communicate with more than one peripheral device, but only is shown to avoid overcrowding the drawing. Examples of the peripheral devices are discussed above in connection with the description accompanying FIGS. 14 and 15.

Host device 2110 may communicate wirelessly with either wireless phone 2130 or RF module 2140 over a short range communications protocol. Wireless phone 2130 and RF module 2140 may wirelessly communicate with communications source 2150 over a long-range communications protocol.

Thus it is seen that personal area network systems and methods are provided. It is understood that the steps shown in the flowcharts discussed above are merely illustrative and that existing steps may be modified, added or omitted. Those skilled in the art will appreciate that the invention can be practiced by other than the described embodiments, which are presented for purposes of illustration rather than of limitation, and the invention is limited only by the claims which follow.

What is claimed is:

1. A method for using a media player to selectively communicate with one of a plurality of long-range communications devices using a short-range communications protocol, each long-range communications device having a long-range communications protocol that enables a user of the media player to engage in a long-range communications event requiring access to a communications source, and wherein each long-range communications device circuitry for wirelessly communicating with the communications source during the long-range communications event, but each long-range communications device does not include a user interface for enabling a user to control any aspect of a long-range communications event, and wherein the media player is incapable of wirelessly communicating directly with the communications source, the method comprising:

detecting whether two or more of the plurality of long-range communication devices are within a personal area network hosted by the media player;

selecting one of the detected long-range communications devices for accessing that device's long-range communications protocol;

providing authentication information to the selected one of the detected long-range communications device, wherein the authentication information is used to authenticate the long-range communications device to the communications source; and using the long-range communications protocol of the selected long-range communications device to enable a user to engage in a long-range communications event by directly interacting with the media player, wherein data associated with the long-range communications event is transmitted between the media player and the selected long-range communications device using the short-range communications protocol.

2. The method of claim 1, further comprising:
determining whether to select a different long-range communications device; and
selecting the different long-range communications device when the media player makes the determination to select that different long-range communications device.

3. The method of claim 1, further comprising:
transmitting communications event data to the selected long-range communications device.

4. The method of claim 1, further comprising:
receiving communications event data from the selected long-range communications device.

5. An article comprising an RF module that is integrated within at least one portion of the article, the RF module comprising:

short-range communications circuitry for establishing a short-range wireless communications link with a device other than the RF module, wherein the device other than the RF module provides authentication information to the RF module, using the short-range communications circuitry, to enable the RF module to authenticate itself to a telephone communications source and the device is incapable of wirelessly communicating directly with the telephone communications source; and long-range communications circuitry that can be accessed by the device, via the short-range wireless communications link, to enable the device to initiate a long-range communications event, the long-range communications circuitry operative to wirelessly communicate with the telephone communications source, wherein the RF module does not include a user interface for enabling a user to control any aspect of the long-range communications event, and wherein the article of clothing is an article of clothing or a bag.

6. The article of claim 5 comprising first and second article portions, and wherein the RF module is constructed to have first and second module portions, wherein the first module portion resides in the first article portion and the second module portion resides in the second article portion.

7. The article of claim 5, wherein the RF module comprises a power source.

8. The article of claim 7, wherein the power source is removable.

9. The article of claim 5, wherein at least a portion of the RF module is located in a region of the article that promotes transceiver functionality of the RF module.

10. A non-transitory computer readable medium having one or more instructions thereon for enabling a device to access long range communication circuitry of an RF module, wherein the long range communication circuitry is an implementation of a long range communication protocol, the one or more instructions when executed by one or more processors, causing the one or more processors to carry out:

detecting at least one interaction with a user interface;

determining that the at least one interaction is a user selection to process a long range communication event, wherein the long range communication event processing requires access to the long range communication protocol in order to communicate with a communication source;

establishing a short range communication link with the RF module using an implementation of a short range communications protocol, wherein the RF module does not include a user interface for enabling a user to control any aspect of the long range communication event;

sending identification information to the RF module, wherein the identification information is used to authenticate the RF module to the communication source in order to process the long range communication event;

accessing the long range communication circuitry over the short range communication link to direct processing of the long range communication event; and receiving data over the short range communication link from the RF module, wherein the data indicates results from at least partial processing of the long range communication event.

11. The computer readable medium of claim 10, wherein the long range communication event comprises at least one of a telephone call, a text message, an email, and a data for provision of a service offered by a wireless service provider.

12. The computer readable medium of claim 10, wherein the one or more processors further carry out:
sending a request to the RF module to execute a function offered by the long-range communication protocol over the short range communication link, wherein the function is used to at least partially process the long-range communication event; and
receiving data over the short range communication link from the RF module indicating results for execution of the function.

13. The computer readable medium of claim 10, wherein the identification information is an identifier for at least one of a subscriber identity module card, a removeable user identity module, and a subscriber for a wireless phone service.

14. The computer readable medium of claim 10, wherein the communication source is at least one of a communications tower and a telecommunications server.

15. The computer readable medium of claim 10, wherein the long range communication protocol is able to communicate over node-to-node distances that are at least one order of magnitude greater than node-to-node distances for the short range communication protocol.

16. The computer readable medium of claim 10, wherein circuitry for the user interface for the RF module is stored on the device.

17. A non-transitory computer readable medium having one or more instructions thereon for providing a device with access to long range communication circuitry at an RF module, wherein the long range communication circuitry is an implementation of a long range communication protocol, the instructions when executed by one or more processors, causing the one or more processors to carry out:
establishing a short range communication link with the device using an implementation of a short range communications protocol, wherein the RF module does not include the user interface for enabling a user to control any aspect of a long range communication event;
receiving identification information that can be used to authenticate the RF module to a communication source in order to process the long range communication event;
authenticating the RF module to the communication source with the identification information;
receiving a request to access the long range communication circuitry over the short range communication link to direct processing of a long range communication event, wherein the long range communication event processing requires access to the long range communication protocol in order to communicate with the communication source; and
sending data over the short range communication link that indicates results from at least partial processing of the long range communication event.

18. The computer readable medium of claim 17, wherein the long range communication event comprises at least one of a telephone call, a text message, an email, and a data for provision of a service offered by a wireless service provider.

19. The computer readable medium of claim 17, wherein the one or more processors further carry out:
sending a request to the RF module to execute a function offered by the long-range communication protocol over the short range communication link, wherein the function is used to at least partially process the long-range communication event; and
receiving data over the short range communication link from the RF module indicating results for execution of the function.

20. The computer readable medium of claim 17, wherein the identification information is an identifier for at least one of a subscriber identity module card, a removeable user identity module, and a subscriber for a wireless phone service.

21. The computer readable medium of claim 17, wherein the communication source is at least one of a communications tower and a telecommunications server.

22. The computer readable medium of claim 17, wherein the long range communication protocol is able to communicate over node-to-node distances that are at least one order of magnitude greater than node-to-node distances for the short range communication protocol.

23. The computer readable medium of claim 17, wherein circuitry for the user interface for the RF module is stored on the device.

* * * * *